US012712429B2

(12) United States Patent
Zhu et al.

(10) Patent No.: US 12,712,429 B2
(45) Date of Patent: Aug. 18, 2026

(54) MULTIPHASE BUCK CONVERTERS WITH INTEGRATED COUPLED INDUCTORS AND CONTROLLABLE COUPLING

(71) Applicant: VIRGINIA TECH INTELLECTUAL PROPERTIES, INC., Blacksburg, VA (US)

(72) Inventors: Feiyang Zhu, Blacksburg, VA (US); Qiang Li, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 360 days.

(21) Appl. No.: 18/446,888

(22) Filed: Aug. 9, 2023

(65) Prior Publication Data

US 2025/0055365 A1 Feb. 13, 2025

(51) Int. Cl.
*H02M 1/00* (2007.01)
*H01F 27/30* (2006.01)
(Continued)

(52) U.S. Cl.
CPC ........ *H02M 1/0064* (2021.05); *H01F 27/306* (2013.01); *H01F 27/38* (2013.01); *H02M 3/158* (2013.01)

(58) Field of Classification Search
CPC ... H02M 1/0064; H02M 3/158; H01F 27/306; H01F 27/38
See application file for complete search history.

(56) References Cited

U.S. PATENT DOCUMENTS 7,176,662 B2 * 2/2007 Chandrasekaran . H02M 3/1588 323/284
7,298,118 B2 * 11/2007 Chandrasekaran . H02M 3/1588 323/222
(Continued)

OTHER PUBLICATIONS

Jiang, Shuai, et al. "Driving 48V Technology Innovations Forward: Hybrid Converters and Trans-Inductor Voltage Regulator (TLVR)" Google LLC, Mar. 2020. pp. 1-16.
(Continued)

*Primary Examiner* — Rafael O De Leon Domenech
(74) *Attorney, Agent, or Firm* — Perilla Knox & Hildebrandt LLP; Jason M. Perilla

(57) ABSTRACT

Power converters with integrated controllable coupling inductors are described. An example power converter includes a number of converter stages and an integrated coupled inductor. The integrated coupled inductor includes a magnetic core having a first side leg, a first leg, a center leg, a second leg, and a second side leg. The integrated coupled inductor also includes a first and second windings for first and second converter stage among the converter stages. The first winding extends around the first leg, and the second winding extends around the second leg of the magnetic core. The integrated coupled inductor can also include a second magnetic core with third and fourth windings for additional converter stages and a coupling winding extending around center legs of the magnetic core and the second magnetic core. The integrated coupled inductor does not include a coupling inductor separate from the magnetic core and the second magnetic core.

20 Claims, 11 Drawing Sheets

(51) Int. Cl.

| | |
|---|---|
| ***H01F 27/38*** | (2006.01) |
| ***H02M 3/158*** | (2006.01) |

(56) References Cited

U.S. PATENT DOCUMENTS

| | | | | |
|---|---|---|---|---|
| 7,791,321 | B2 | 9/2010 | Xu et al. | |
| 7,876,191 | B2 * | 1/2011 | Chandrasekaran ... | H02M 3/158<br>336/212 |
| 2006/0197510 | A1 * | 9/2006 | Chandrasekaran . | H02M 3/1588<br>323/222 |
| 2007/0114979 | A1 * | 5/2007 | Chandrasekaran . | H02M 3/1588<br>323/222 |

OTHER PUBLICATIONS

N/a, "Fast multi-phase trans-inductor voltage regulator", Technical Disclosure Commons, May 9, 2019. pp. 1-15.

Xu, Ming, et al. "Novel Coupled-Inductor Multi-Phase VRs." IEEE, 2007. pp. 113-119.

Z. Lu and W. Chen, "Multi-Phase Inductor Coupling Scheme with Balancing Winding in VRM Applications," APEC 07—Twenty-Second Annual IEEE Applied Power Electronics Conference and Exposition, Anaheim, CA, USA, 2007, pp. 731-735.

* cited by examiner

100A
T1a
110A
114
111A
W1a
113A
115
112A
120A
130
$\Phi_1$
$i_1$
132
$i_2$

MULTIPHASE BUCK CONVERTERS WITH INTEGRATED COUPLED INDUCTORS AND CONTROLLABLE COUPLING

BACKGROUND

Many electronic devices and systems rely upon power at a well-regulated, constant, and well-defined voltage for proper operation. In that context, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, provide a DC to DC conversion, provide an AC to AC conversion, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

High performance Application Specific Integrated Circuits (ASICs), including a range of different types of Central Processing Units (CPUs) and Graphics Processing Units (GPUs), can consume a significant amount of power at relatively low voltage and high current specifications. The next-generation of GPUs are specified to consume hundreds of amperes (A) of power at voltages between about 0.8-1.8 volts (V). The larger power consumption of these new microprocessors demands new types of power converters capable of supplying more power, and the size and efficiency the new power converters continues to be a concern.

SUMMARY

Power converters with integrated controllable coupling inductors are described. An example power converter includes a number of converter stages and an integrated coupled inductor. The integrated coupled inductor includes a magnetic core having a first side leg, a first leg, a center leg, a second leg, and a second side leg. The integrated coupled inductor also includes a first and second windings for first and second converter stage among the converter stages. The first winding extends around the first leg, and the second winding extends around the second leg of the magnetic core. The integrated coupled inductor can also include a second magnetic core with third and fourth windings for additional converter stages and a coupling winding extending around center legs of the magnetic core and the second magnetic core. The integrated coupled inductor does not include a coupling inductor separate from the magnetic core and the second magnetic core.

In other aspects of the embodiments, the magnetic core includes leakage inductances $L_{k1}$ and $L_{k2}$, and the second magnetic core includes leakage inductances $L_{k3}$ and $L_{k4}$. The leakage inductances $L_{k1}$, $L_{k2}$, $L_{k3}$, and $L_{k4}$ form a coupling inductor in the integrated coupled inductor and are coupled in series with the coupling winding. The inductance values of the leakage inductances $L_{k1}$ and $L_{k2}$ are set by a ratio of cross-sectional areas of the first side leg and the second side leg of the magnetic core to a cross-sectional area of the center leg of the magnetic core. The inductance values of the leakage inductances $L_{k3}$ and $L_{k4}$ are set by a ratio of cross-sectional areas of a first side leg and a second side leg of the second magnetic core to a cross-sectional area of the center leg of the second magnetic core.

Another example multiphase buck power converter includes a number of buck converter stages and an integrated coupled inductor for the buck converter stages. The integrated coupled inductor includes a first magnetic core comprising side legs and a second magnetic core comprising side legs. The integrated coupled inductor also includes a first winding for a first buck converter stage among the buck converter stages and a second winding for a second buck converter stage among the buck converter stages. The first and second windings extend around the first magnetic core. The integrated coupled inductor also includes a third winding for a third buck converter stage among the buck converter stages and a fourth winding for a fourth buck converter stage among the buck converter stages. The third and fourth windings extend around the second magnetic core. The integrated coupled inductor also includes a coupling winding extending around the magnetic core and the second magnetic core.

Another example power converter includes a number of converter stages and an integrated coupled inductor for the converter stages. The integrated coupled inductor includes a first magnetic core having a first side leg, a center leg, a first side leg segment, and a second side leg segment, and a second magnetic core having a first side leg, a center leg, a first side leg segment, and a second side leg segment. The integrated coupled inductor also includes a first winding for a first converter stage among the converter stages, with the first winding extending around the center leg of the first magnetic core, a second winding for a second converter stage among the converter stages, with the second winding extending around a center leg of the second magnetic core, and a coupling winding extending around the center leg and the first side leg segment of the first magnetic core and around the center leg and the first side leg segment of the second magnetic core.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
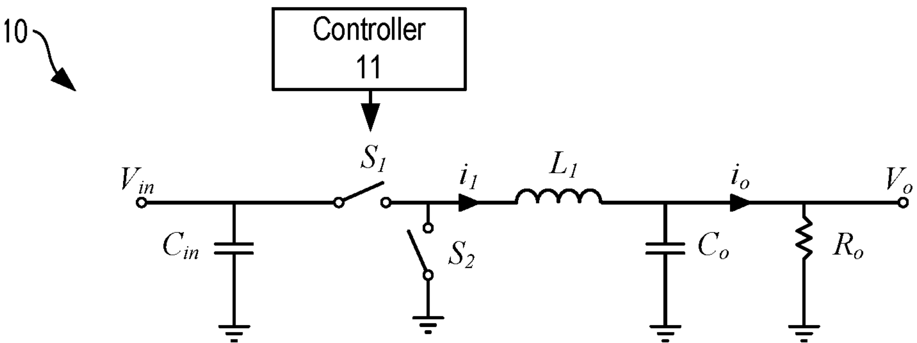
FIG. 1 illustrates an example power converter according to various aspects of the present disclosure.

Power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, provide a DC to DC conversion, provide an AC to AC conversion, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

High performance Application Specific Integrated Circuits (ASICs), including a range of different types of Central Processing Units (CPUs) and Graphics Processing Units (GPUs), can consume a significant amount of power at relatively low voltage and high current specifications. The next-generation of GPUs are specified to consume hundreds of amperes (A) of power at voltages between about 0.8-1.8 volts (V). As an example, a power converter designed to supply the power for such GPUs may be designed to convert power from 12V at 30 A to power at 1.8V at 600 A. A range of design and operating concerns are inherent in the design of such a power converter.

A range of isolated and non-isolated power converters are known. Examples of non-isolated power converters include buck, books, buck-boost, and Ćuk power converters. A buck or step-down converter is one example of a non-isolated DC-to-DC power converter that could be relied upon for the conversion of power at a higher DC voltage at a lower current rating to a lower DC voltage at a higher current rating. As a switching converter, a buck converter can provide better power efficiency than linear regulators. The efficiency of buck converters can be relatively high, making buck converters a good choice for DC-to-DC power conversion applications used in computers and computing systems.

A typical buck converter includes two or more diodes or transistors for current switching and capacitors and inductors for charge storage and voltage step-down. To reduce voltage ripple, buck converters can include capacitive or capacitive/inductive filters. Buck converters can operate over a range of switching frequencies, including frequencies ranging from tens of kHz to several MHz or higher. The use of higher switching frequencies allows for the use of smaller inductors and capacitors but can also be attributed to higher switching losses due to increased transistor switching.

The power demand for the operation of modern microprocessors, including modern ASICS, CPUs, and GPUs, can reach several hundred amperes. The power demand for such microprocessors can also vary significantly and quickly, with current demand slew rates of larger than 1000 A/μs in some cases, based on the time-varying processing demands of the microprocessors. A range of challenges exist in the design of voltage regulators capable of supplying sufficient power, at a fast transient response, to microprocessors at high-efficiency. In multiphase buck converters, each phase of a buck converter typically requires a discrete inductor as the energy storage element. However, design conflicts exist for multiphase buck converter with non-coupled inductors. The integrated controllable coupling concepts described herein can be relied upon to realize reduced steady-state current ripple and fast transient response in multiphase buck converters, among other benefits.

FIG. 1 illustrates an example power converter 10 according to various aspects of the present disclosure. The power converter 10 is illustrated as a representative example of a buck or step-down power converter. In some cases, the power converter 10 can include other components that are not illustrated in FIG. 1, such as additional capacitors, additional inductors, additional diodes or switching transistors, and other components. The power converter 10 can be implemented using a combination of integrated and discrete circuit components, for example, on one or more printed circuit boards (PCBs). The concepts of integrated controllable coupling described herein can be applied in the power converter 10, as one example, among other types of power converters.

The power converter 10 is a buck or step-down power converter and includes an input capacitor $C_{in}$, switching devices $S_1$ and $S_2$, an inductor $L_1$, an output capacitor $C_o$, and a controller 11, among possibly other components. An input voltage $V_{in}$ is applied as an input to the power converter 10, and an output voltage $V_o$ is generated at an output of the power converter 10. The switching devices $S_1$ and $S_2$ can be embodied as switching transistors or a combination of diodes and switching transistors. In some cases, the switching device $S_1$ can be embodied as a switching transistor and the switching device $S_2$ can be embodied as a diode. In other cases, the switching devices $S_1$ and $S_2$ can be embodied as switching transistors.

The controller 11 can be relied upon to generate gate control signals to control the operation of the switching devices $S_1$ and $S_2$ at an operating frequency of the power converter 10, which can range among the embodiments. Example operating frequencies for the power converter 10 can range from tens of kHz to several MHz or higher. As one example, the switching devices $S_1$ and $S_2$ can be operated by pulse width modulation (PWM) control signals generated by the controller 11. Based on the switching control, the switching devices $S_1$ and $S_2$ can be opened and closed, alternately, to excite a field in the inductor $L_1$ through supply of the current $i_1$ using the input voltage $V_{in}$ during one phase of a switching cycle, charge the output capacitor $C_o$ based on the energy stored in the field of the inductor $L_1$ during another phase of the switching cycle, and discharge the inductor $L_1$ through connection to ground in another phase of the switching cycle. Power transferred to the output capacitor $C_o$ can be supplied to the load $R_o$ at the output voltage $V_o$.

Figure 2:
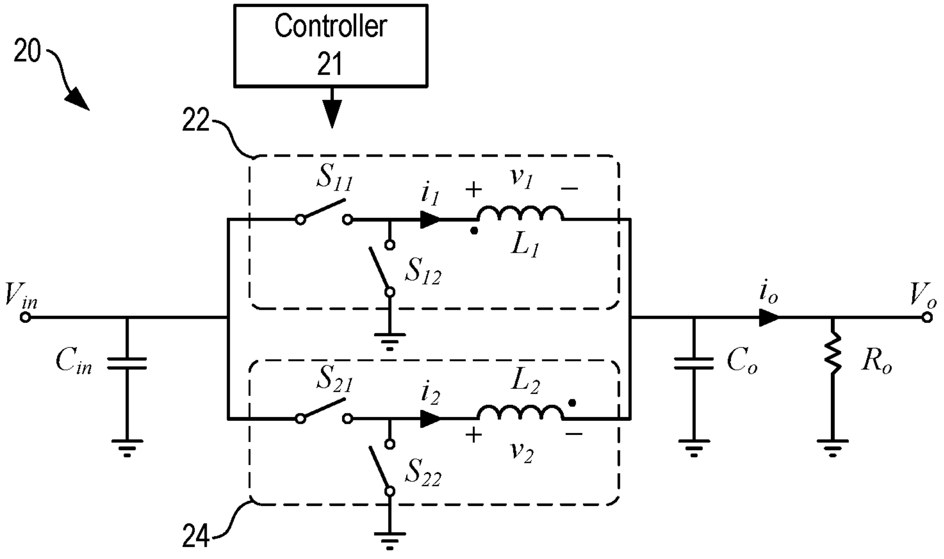
FIG. 2 illustrates an example multiphase buck power converter according to various aspects of the present disclosure.

As a scalable, high-efficiency, and simple converter topology, the power converter 10 can be extended to a multiphase buck converter for applications requiring higher power. FIG. 2 illustrates an example multiphase buck power converter 20 ("power converter 20") according to various aspects of the present disclosure. In some cases, the power converter 20 can include other components that are not illustrated in FIG. 2, such as additional capacitors, additional inductors, additional diodes or switching transistors, and other components. The power converter 20 includes a controller 21 and two converter stages, including converter stage 22 and converter stage 24, but the power converter 20 can also be extended to include additional converter stages in other examples. The power converter 20 can be implemented using a combination of integrated and discrete circuit components, for example, on one or more PCBs. The concepts of integrated controllable coupling described herein can be applied in the power converter 20, as one example, among other types of power converters.

The power converter 20 is a multiphase buck or step-down power converter and includes an input capacitor $C_{in}$ and an output capacitor $C_o$, among possibly other components. An input voltage $V_{in}$ is applied as an input to the power converter 20, and an output voltage $V_o$ is generated at an output of the power converter 20. The converter stage 22 includes switching devices $S_{11}$ and $S_{12}$ and an inductor $L_1$, among possibly other components. The switching devices $S_{11}$ and $S_{12}$ can be embodied as switching transistors or a combination of diodes and switching transistors. In some cases, the switching device Sn can be embodied as a switching transistor and the switching device $S_{12}$ can be embodied as a diode. In other cases, the switching devices $S_{11}$ and $S_{12}$ can be embodied as switching transistors. The converter stage 24 includes switching devices $S_{21}$ and $S_{22}$ and an inductor $L_2$, among possibly other components. The switching devices $S_{21}$ and $S_{22}$ can be embodied as switching transistors or a combination of diodes and switching transistors. In some cases, the switching device $S_{21}$ can be embodied as a switching transistor and the switching device $S_{22}$ can be embodied as a diode. In other cases, the switching devices $S_{21}$ and $S_{12}$ can be embodied as switching transistors.

The controller 21 can be relied upon to generate gate control signals to control the operation of the switching devices Sn, $S_{12}$ and $S_{21}$, $S_{22}$ at an operating frequency of the power converter 20, which can range among the embodiments. Example operating frequencies for the power converter 20 can range from tens of kHz to several MHz or higher. As one example, the switching devices $S_{11}$, $S_{12}$ and $S_{21}$ and $S_{22}$ at can be operated by PWM control signals generated by the controller 21, with a variation in phase (i.e., a phase shift) among the control signals for the converter stages 22 and 24. Based on the switching control, the switching devices $S_{11}$ and $S_{12}$ can be opened and closed, alternately, to excite a field in the inductor $L_1$ through supply of the current $i_1$ using the input voltage $V_{in}$ during one phase of a switching cycle, charge the output capacitor $C_o$ based on the energy stored in the field of the inductor $L_1$ during another phase of the switching cycle, and discharge the inductor $L_1$ through connection to ground in another phase of the switching cycle. Additionally, the switching devices $S_{21}$ and $S_{22}$ can be opened and closed, alternately, to excite a field in the inductor $L_2$ through supply of the current $i_2$ using the input voltage $V_{in}$ during one phase of a switching cycle, charge the output capacitor $C_o$ based on the energy stored in the field of the inductor $L_2$ during another phase of the switching cycle, and discharge the inductor $L_2$ through connection to ground in another phase of the switching cycle. Power transferred to the output capacitor $C_o$ can be supplied to the load $R_o$ at the output voltage $V_o$.

The use of larger inductors (e.g., for $L_1$, $L_2$, or both $L_1$ and $L_2$) in the power converters 10 and 20 can result in relatively smaller current ripple and less device loss in the switching devices. However, larger inductor currents do not track larger time-varying load transients quickly. This can result in a larger output voltage spikes and is not preferred for loads exhibiting larger time-varying current demands. Smaller inductors and increased switching frequencies can be used in the power converters 10 and 20 to increase the transient response for loads exhibiting larger time-varying current demands. However, this can result in a larger current ripple and larger device loss in the switching devices. Thus, design conflicts exist when selecting the inductors in the power converters 10 and 20.

Conventionally, discrete inductors have been used in each stage or phase of a multiphase buck or step-down power converter. For example, the inductors $L_1$ and $L_2$ have been implemented as separate or discrete components in the power converter 20 in some cases. The use of coupled inductors in multiphase buck or step-down power converters, such as in the power converter 20, can help to achieve smaller steady-state current ripple and faster transient response.

Figures 3A, 3B:
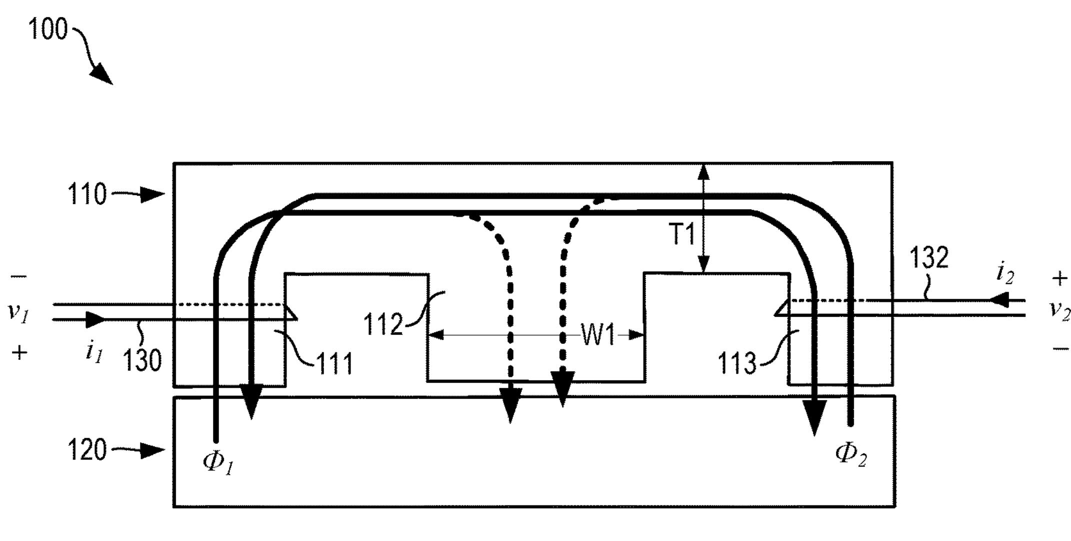
FIG. 3A illustrates an example integrated magnetic core coupled inductor for a multiphase buck converter according to various aspects of the present disclosure.
FIG. 3B illustrates an example integrated magnetic core coupled inductor for a multiphase buck converter according to various aspects of the present disclosure.

FIG. 3A illustrates an example integrated magnetic core coupled inductor 100 ("integrated core inductor 100") for a multiphase buck converter. The integrated core inductor 100 can be relied upon to implement the inductors $L_1$ and $L_2$ in the power converter 20 as a single component, rather than relying on separate or discrete components. The integrated core inductor 100 includes a single "EI" core with an "E" core component 110 and an "I" core component 120. In other examples, the integrated core inductor 100 can be embodied as an "EE" core or other types of cores. The core of the integrated core inductor 100 can be embodied as a material of high magnetic permeability, such as a ferromagnetic material like iron, laminated silicon steel, laminated iron sheets, or other solid or laminated ferromagnetic ceramic, metal, metal alloy, or related material(s).

The "E" core 110 includes a first leg 111, a center leg 112, and a second leg 113. The integrated core inductor 100A also includes a first winding 130 to form the inductor $L_1$ and a second winding 132 to form the inductor $L_2$. The first winding 130 is wound around the first leg 111 to form the inductor $L_1$, and the second winding 132 to is wound around the second leg 113 to form the inductor $L_2$. The current $i_1$ in the first winding 130 extends in a first direction around the first leg 111, and the current $i_2$ in the second winding 132 extends in a second direction around the second leg 113 (e.g., clockwise in vs. counter-clockwise $i_2$ or vice versa). The first and second windings 130 and 132 of the integrated core inductor 100 can be embodied as conductive windings formed from a conductive material, such as copper, for example. In one example, the windings can be embodied as copper bar windings, although magnet wire, Litz wire, and other types of conductive wires can be relied upon for the windings. In one example, the first and second windings 130 and 132 can include a single turn around the first and second legs 111 and 113. In other cases, the first and second windings 130 and 132 can include more than one turn around the first and second legs 111 and 113 depending on the target inductance values of $L_1$ and $L_2$ and other considerations.

The inductors $L_1$ and $L_2$ are coupled in the integrated core inductor 100 because the path of flux $\Phi_1$ created by the current $i_1$ extends in part through the center leg 112 and in part through the second leg 113. Additionally, the path of flux $\Phi_2$ created by the current $i_2$ also extends in part through the center leg 112 and through the first leg 111. The flux interaction between $\Phi_1$ and $\Phi_2$ in the integrated core inductor 100 couples the inductors $L_1$ and $L_2$ together. The inductances of the inductors $L_1$ and $L_2$ vary or are non-linear during operation of the power converter 20 when the integrated core inductor 100 is used to implement the inductors $L_1$ and $L_2$. Particularly, the currents in the inductors $L_1$ and $L_2$ vary and have different slew rates during switching cycles of the power converter 20 when the integrated core inductor 100 is used.

The use of the integrated core inductor 100 in the power converter 20 leads to a faster transient response and smaller switching losses as compared to using discrete inductors $L_1$ and $L_2$. Additionally, an amount of flux cancellation can occur between $\Phi_1$ and $\Phi_2$ in the core components 110 and 120 (or portions of the core components 110 and 120), which can permit the use of a smaller core for the integrated core inductor 100 as compared to the use of separate cores for discrete inductors $L_1$ and $L_2$.

FIG. 3B illustrates an example integrated magnetic core coupled inductor 100A ("integrated core inductor 100A") for a multiphase buck converter. The integrated core inductor 100A can also be relied upon to implement the inductors $L_1$ and $L_2$ in the power converter 20 as a single component, and it offers some benefits as compared to the integrated core inductor 100 shown in FIG. 3A. The integrated core inductor 100A includes a single "EI" core with an "E" core component 110A and an "I" core component 120A. In other examples, the integrated core inductor 100A can be embodied as an "EE" core or other types of cores. The core of the integrated core inductor 100A can be embodied as a material of high magnetic permeability, such as a ferromagnetic material like iron, laminated silicon steel, laminated iron sheets, or other solid or laminated ferromagnetic ceramic, metal, metal alloy, or related material(s).

The "E" core 110A includes a first leg 111A, a center leg 112A, and a second leg 113A. The "E" core 110A also includes a first side leg 114 and a second side leg 115. The integrated core inductor 100A also includes a first winding 130 to form the inductor $L_1$ and a second winding 132 to form the inductor $L_2$. The first winding 130 is wound around the first leg 111A to form the inductor $L_1$, and the second winding 132 to is wound around the second leg 113A to form the inductor $L_2$. The current $i_1$ in the first winding 130 extends in a first direction around the first leg 111A, and the current $i_2$ in the second winding 132 extends in a second direction around the second leg 113A (e.g., clockwise $i_1$ vs. counter-clockwise $i_2$ or vice versa). The first and second windings 130 and 132 of the integrated core inductor 100A can be embodied as conductive windings formed from a conductive material, such as copper, for example. In one example, the windings can be embodied as copper bar windings, although magnet wire, Litz wire, and other types of conductive wires can be relied upon for the windings. In one example, the first and second windings 130 and 132 can include a single turn around the first and second legs 111A and 113A. In other cases, the first and second windings 130 and 132 can include more than one turn around the first and second legs 111A and 113A depending on the target inductance values of $L_1$ and $L_2$ and other considerations.

The inductors $L_1$ and $L_2$ are coupled in the integrated core inductor 100A because the path of flux $\Phi_1$ created by the current $i_1$ extends in part through the center leg 112A and in part through the second leg 113A. Additionally, the path of flux $\Phi_2$ created by the current $i_2$ also extends in part through the center leg 112A and through the first leg 111A. The flux interaction between $\Phi_1$ and $\Phi_2$ in the integrated core inductor 100A couples the inductors $L_1$ and $L_2$ together. Further, the path of flux $\Phi_1$ created by the current $i_1$ extends in part through the first side leg 114 and in part through the second side leg 115. Additionally, the path of flux $\Phi_2$ created by the current $i_2$ also extends in part through the first side leg 114 and in part through the second side leg 115.

In the integrated core inductor 100A, the total or combined flux density extending through the top of the first core component 110A is reduced because the flux $\Phi_1$ and $\Phi_2$ extends in part through the side legs 114 and 115. Thus, the thickness T1*a* of the core component 110A shown in FIG. 3B can be smaller than the thickness T1 of the core component 100 shown in FIG. 3A. As one example, the thickness T1 can be 2.5 mm and T1*a* can be reduced to 1.3 mm. Additionally, the width W1*a* of the core component 110A shown in FIG. 3B can be smaller than the width W1*a* of the core component 100 shown in FIG. 3A. As one example, the width W1 can be 4.8 mm and the W1*a* can be reduced to 2.4 mm. Thus, the incorporation of the side legs 114 and 115 in the integrated core inductor 100A leads to a smaller overall size of the integrated core inductor 100A shown in FIG. 3B as compared to the integrated core inductor 100 shown in FIG. 3A. The overall footprint and volume of the integrated core inductor 100A can be reduced by about 30% or more as compared to the integrated core inductor 100.

The integrated core inductor 100A shown in FIG. 3B can also be extended to use with additional converter stages. For example, the core 110A can include one or more legs in addition to the first leg 111A and the second leg 113A. The core 110A can also include one or more center legs in addition to the center leg 112A.

However, if the power converter 20 is extended to include additional stages beyond the converter stages 22 and 24 (i.e., more than two stages), issues arise when attempting to extend the integrated core inductors 100 and 100A for use with the additional stages. For example, differences in ripple currents can occur among the stages, as the flux interaction and coupling among the stages is asymmetrically distributed across the core when it is extended for use with more than two stages, and complicated core structures can be necessary for direct coupling.

Coupled inductors can be implemented in multiphase buck power converters in other ways. Examples of coupled inductors include indirect-coupled inductors (ICLs) and hybrid-coupled inductors (HCLs). ICL and HCL structures offer symmetrical coupling, relatively simple core structures, design flexibility, and scalability. The coupling in an ICL is facilitated through an additional winding loop and is controlled by the inductance of a coupling inductor $L_c$, as described below.

Figure 4:
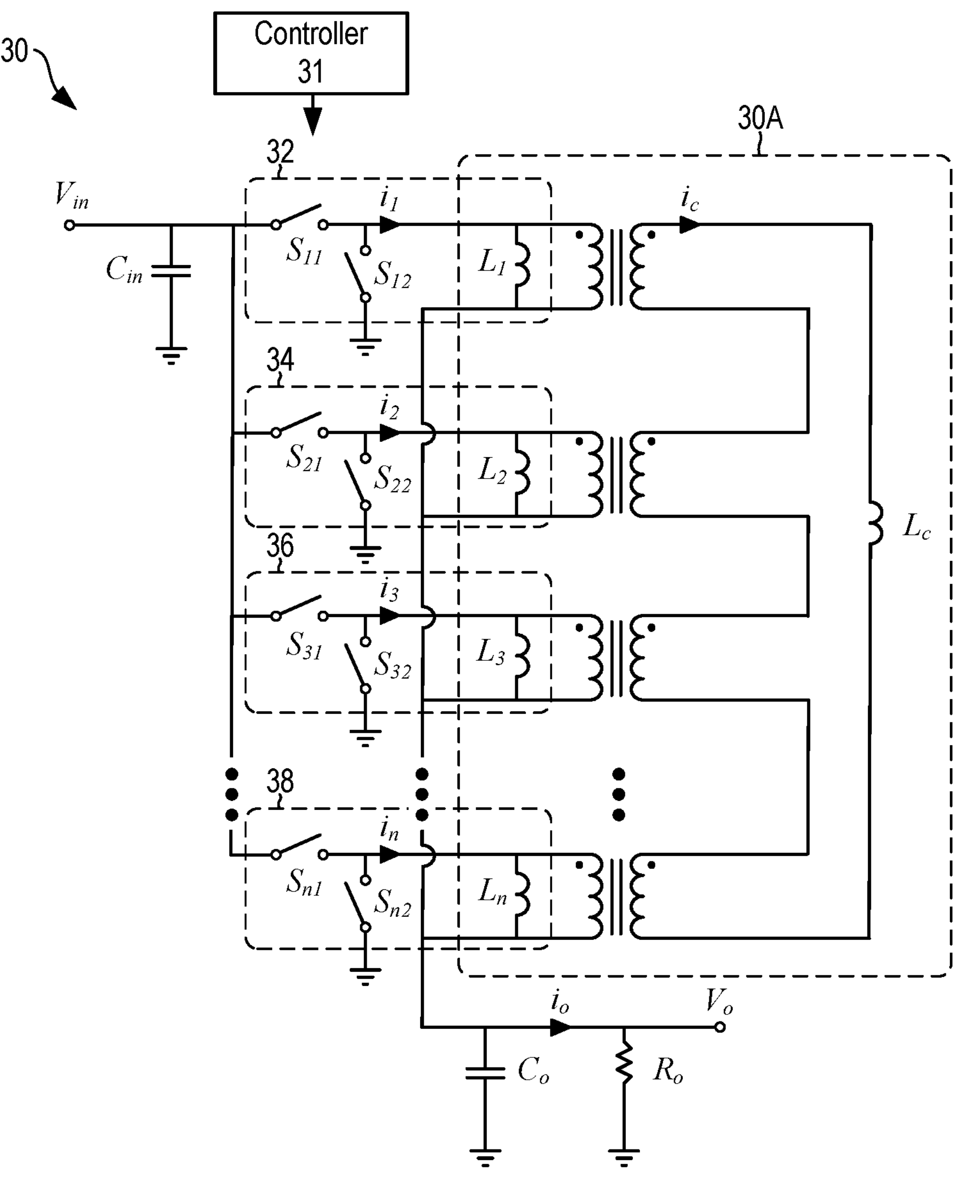
FIG. 4 illustrates an example multiphase buck power converter according to various aspects of the present disclosure.

FIG. 4 illustrates an example multiphase buck power converter 30 ("power converter 30"). In some cases, the power converter 30 can include other components that are not illustrated in FIG. 4, such as additional capacitors, additional inductors, additional diodes or switching transistors, and other components. The power converter 30 includes a controller 31 and converter stages 32, 34, 36, and 38 in the example shown. The power converter 30 can include any number of converter stages (e.g., "n" converter stages) in various examples. The power converter 30 can be implemented using a combination of integrated and discrete circuit components, for example, on one or more PCBs. The concepts of integrated controllable coupling described herein can be applied in the power converter 30, as one example, among other types of power converters.

The power converter 30 is a multiphase buck or step-down power converter and includes an input capacitor $C_{in}$ and an output capacitor $C_o$. An input voltage $V_{in}$ is applied as an input to the power converter 30, and an output voltage $V_o$ is generated at an output of the power converter 30. The converter stage 32 includes switching devices $S_{11}$ and $S_{12}$ and an inductor $L_1$, among possibly other components. The switching devices $S_{11}$ and $S_{12}$ can be embodied as switching transistors or a combination of diodes and switching transistors. In some cases, the switching device $S_{11}$ can be embodied as a switching transistor and the switching device $S_{12}$ can be embodied as a diode. In other cases, the switching devices $S_{11}$ and $S_{12}$ can be embodied as switching transistors. The converter stage 34 includes switching devices $S_{21}$ and $S_{22}$ and an inductor $L_2$, among possibly other components. The switching devices $S_{21}$ and $S_{22}$ can be embodied as switching transistors or a combination of diodes and switching transistors. The converter stage 36 includes switching devices $S_{31}$ and $S_{32}$ and an inductor $L_3$, among possibly other components. The switching devices $S_{31}$ and $S_{32}$ can be embodied as switching transistors or a combination of diodes and switching transistors. The converter stage 38 includes switching devices $S_{n1}$ and $S_{n2}$ and an inductor $L_n$, among possibly other components. The switching devices $S_{n1}$ and $S_{n2}$ can be embodied as switching transistors or a combination of diodes and switching transistors.

The controller 31 can be relied upon to generate gate control signals to control the operation of the switching devices $S_{11}$, $S_{12}$, $S_{21}$, $S_{22}$ $S_{31}$, $S_{32}$, $S_{n1}$, and $S_{n2}$ at an operating frequency of the power converter 30, which can range among the embodiments. Example operating frequencies for the power converter 30 can range from tens of kHz to several MHz or higher. As one example, the switching devices at can be operated by PWM control signals generated by the controller 31, with a variation in phase (i.e., a phase shift) among the control signals for the converter stages 32, 34, 36, and 38. Based on the switching control, the switching devices $S_{11}$ and $S_{12}$ in the converter stage 32 can be opened and closed, alternately, to excite a field in the inductor $L_1$ through supply of the current $i_1$ using the input voltage $V_{in}$ during one phase of a switching cycle, charge the output capacitor $C_o$ based on the energy stored in the field of the inductor $L_1$ during another phase of the switching cycle, and discharge the inductor $L_1$ through connection to ground in another phase of the switching cycle. The switching devices in the converter stages 34, 36, and 38 can also be controlled in a similar way to charge the output capacitor $C_o$ based on the transfer of charge using the inductors $L_2$, $L_3$, and $L_n$. Power transferred to the output capacitor $C_o$ can be supplied to the load $R_o$ at the output voltage $V_o$.

Multiphase buck power converters, such as the power converter 30, have been implemented using discrete inductors. That is, the inductors $L_1$, $L_2$, $L_3$, and $L_n$ have been implemented as separate or discrete components in the power converter 20 in some cases.

However, the power converter 30 can also be implemented using one or more coupled inductors, and the circuit schematic of the power converter 30 shown in FIG. 4 illustrates an implementation using a coupled inductor 30A. The structure of the coupled inductor 30A achieves coupling among the inductors $L_1$, $L_2$, $L_3$, and $L_n$ and can be relied upon to achieve smaller steady-state current ripple, faster transient response, and smaller switching losses in the power converter 30. The coupled inductor 30A can also be implemented to have a smaller overall footprint or volume as compared to a separate implementation of each of the inductors $L_1$, $L_2$, $L_3$, and $L_n$. As noted above, coupled inductors can be implemented in multiphase buck power converters using an ICL or an HCL structure. Examples of ICL and HCL coupling structures are described below.

Figure 5A:
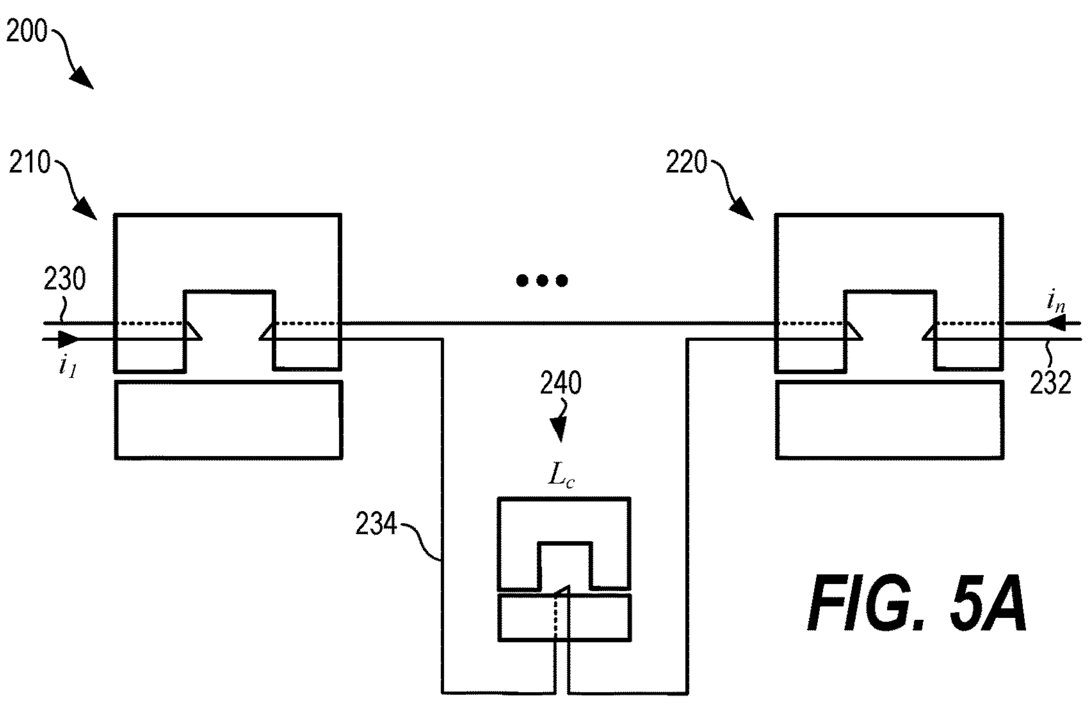
FIG. 5A illustrates an example indirect-coupled inductor according to various aspects of the present disclosure.
Figure 5B:
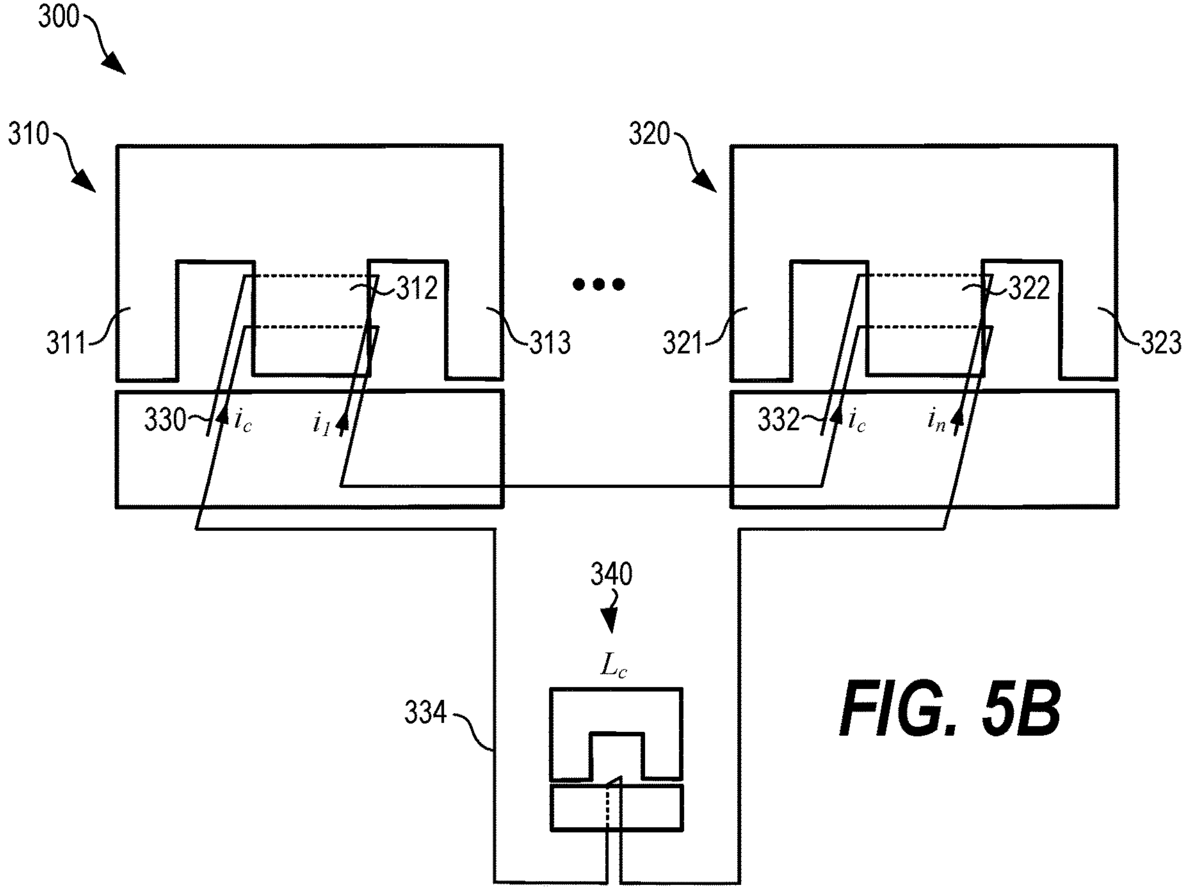
FIG. 5B illustrates another example indirect-coupled inductor according to various aspects of the present disclosure.

FIG. 5A illustrates an example indirect-coupled inductor 200 ("coupled inductor 200"). The coupled inductor 200 is an example of an ICL and can be relied as the coupled inductor 30A in the power converter 30, to provide coupling among the inductors $L_1$, $L_2$, $L_3$, and $L_n$. The coupled inductor 200 includes a core for each converter stage 32, 34, 36, and 38 in the power converter 30. For example, the coupled inductor 200 includes a core 210 for the inductor $L_1$ in the converter stage 32 and a core 220 for the inductor $L_n$ in the converter stage 38. The coupled inductor 200 also includes additional cores (not shown) for the converter stages 34 and 36. Thus, the coupled inductor 200 includes a separate or discrete core for each converter stage 32, 34, 36, and 38 in the power converter 30. The coupled inductor 200 also includes a coupling core 240. The cores of the coupled inductor 200 are illustrated as "CI" cores in the example shown in FIG. 5A, although the coupled inductor 200 can be embodied using "EI" cores as shown in FIG. 5B, and other types of cores can be relied upon. The cores of the coupled inductor 200 can be embodied as a material of high magnetic permeability, such as a ferromagnetic material like iron, laminated silicon steel, laminated iron sheets, or other solid or laminated ferromagnetic ceramic, metal, metal alloy, or related material(s).

The coupled inductor 200 also includes a winding 230 to form the inductor $L_1$, which is wound around a leg of the core 210, and a winding 232 to form the inductor $L_n$, which is wound around a leg of the core 220. The coupled inductor 200 also includes additional windings around additional cores for the inductors $L_2$ and $L_3$ in the converter stages 34 and 36 of the power converter 30. The coupled inductor 200 also includes a coupling winding 234. The coupling winding 234 is wound around another leg of the core 210, another leg of the core 220, and legs of the cores for the converter stages 34 and 36. The coupling winding 234 is also wound around the coupling core 240, to form the coupling inductor $L_c$. The windings of the coupled inductor 200 can be embodied as conductive windings formed from a conductive material, such as copper, for example. In one example, the windings can be embodied as copper bar windings, although magnet wire, Litz wire, and other types of conductive wires can be relied upon for the windings. The windings for the inductors $L_1$, $L_2$, $L_3$, and $L_n$ of the power converter 30 can include a single turn around the cores in one example. The coupling winding 234 can also include a single turn around the coupling core 240. In other examples, the windings for the inductors $L_1$, $L_2$, $L_3$, and $L_n$ can include more than one turn around the cores depending on the target inductance values of $L_1$, $L_2$, $L_3$, and $L_n$ and other considerations. The coupling winding 234 can also include more than one turn around the coupling core 240 in some cases depending on the target inductance value of $L_c$. The value of $L_c$ can be tailored to control the amount of coupling among the inductors $L_1$, $L_2$, $L_3$, and $L_n$.

In the coupled inductor 200, coupling among the inductors $L_1$, $L_2$, $L_3$, and $L_n$ of the power converter 30 is achieved and can be controlled by the inductance of the coupling inductor $L_c$. Thus, the coupled inductor 200 can help to achieve smaller steady-state current ripple and faster transient response in the power converter 30. However, the coupled inductor 200 has some drawbacks. For example, flux cancellation cannot be achieved in the cores 210, 220, or others, because the windings for each of the inductors $L_1$, $L_2$, $L_3$, and $L_n$ of the power converter 30 are separated and wound respective cores. Without flux cancellation, it is difficult to reduce the size of the cores in the coupled inductor 200, particularly without facing increased core loss. Additionally, the coupling core 240 increases the overall size and footprint of the coupled inductor 200.

FIG. 5B illustrates another example indirect-coupled inductor 300 ("coupled inductor 300"). The coupled inductor 300 is another example of an ICL and can be relied as the coupled inductor 30A in the power converter 30, to provide coupling among the inductors $L_1$, $L_2$, $L_3$, and $L_n$. The coupled inductor 300 includes a core for each converter stage 32, 34, 36, and 38 in the power converter 30. For example, the coupled inductor 300 includes a core 310 for the inductor $L_1$ in the converter stage 32 and a core 320 for the inductor $L_n$ in the converter stage 38. The coupled inductor 300 also includes additional cores (not shown) for the converter stages 34 and 36. Thus, the coupled inductor 300 includes a separate or discrete core for each converter stage 32, 34, 36, and 38 in the power converter 30. The coupled inductor 300 also includes a coupling core 340. The cores of the coupled inductor 300 are illustrated as "EI" cores in the example shown. The cores of the coupled inductor 300 can be embodied as a material of high magnetic permeability, such as a ferromagnetic material like iron, laminated silicon steel, laminated iron sheets, or other solid or laminated ferromagnetic ceramic, metal, metal alloy, or related material(s).

The core 310 includes a first leg 311, a center leg 312, and a second leg 313. The core 320 includes a first leg 321, a center leg 322, and a second leg 323. The coupled inductor 300 also includes a winding 330 to form the inductor $L_1$, which is wound around the center leg 312 of the core 310, and a winding 332 to form the inductor $L_n$, which is wound around the center leg 322 of the core 320. The coupled inductor 300 also includes windings around center legs of cores for the inductors $L_2$ and $L_3$ in the converter stages 34 and 36 of the power converter 30. The coupled inductor 300 also includes a coupling winding 334. The coupling winding 334 is wound around the center leg 312 of the core 310, the center leg 322 of the core 320, and center legs of the cores for the converter stages 34 and 36. The coupling winding 334 is also wound around the coupling core 340, to form the coupling inductor $L_c$. The windings of the coupled inductor 300 can be embodied as conductive windings formed from a conductive material, such as copper, for example. In one example, the windings can be embodied as copper bar windings, although magnet wire, Litz wire, and other types of conductive wires can be relied upon for the windings. The windings for the inductors $L_1$, $L_2$, $L_3$, and $L_n$ of the power converter 30 can include a single turn around the cores in one example. The coupling winding 334 can also include a single turn around the coupling core 340 in one example. In other examples, the windings for the inductors $L_1$, $L_2$, $L_3$, and $L_n$ can include more than one turn around the cores depending on the target inductance values of $L_1$, $L_2$, $L_3$, and $L_n$ and other considerations. The coupling winding 334 can also include more than one turn around the coupling core 340 depending on the target inductance value of $L_c$. The value of $L_c$ can be tailored to control the amount of coupling among the inductors $L_1$, $L_2$, $L_3$, and $L_n$.

In the coupled inductor 300, coupling among the inductors $L_1$, $L_2$, $L_3$, and $L_n$ of the power converter 30 is achieved and can be controlled by the inductance of the coupling inductor $L_c$. Thus, the coupled inductor 300 can help to achieve smaller steady-state current ripple and faster transient response in the power converter 30. However, the coupled inductor 300 has some drawbacks. For example, flux cancellation cannot be achieved in the cores 310, 320, or others, because the windings for each of the inductors $L_1$, $L_2$, $L_3$, and $L_n$ of the power converter 30 are separated and wound around a respective core. Without flux cancellation, it is difficult to reduce the size of the cores in the coupled inductor 300, particularly without facing increased core loss. Additionally, the coupling core 340 increases the overall size and footprint of the coupled inductor 300.

The coupled inductors 200 and 300 shown in FIGS. 5A and 5B are examples of ICL-structured coupled inductors. An HCL-structured coupled inductor can be realized through a combination of the inductor structures shown in FIG. 3A and FIG. 5B. For example, rather than implementing the inductors $L_1$ and $L_2$ on the cores 310 and 320, separately, as in FIG. 5B, the inductors $L_1$ and $L_2$ can be established by windings around the first leg 311 and the second leg 313 of the core 310 in an HCL-structured coupled inductor. Additionally, rather than implementing the inductors $L_3$ and $L_n$ on separate cores, as in FIG. 5B, the inductors $L_3$ and $L_n$ can be established by windings around the first leg 321 and the second leg 323 of the core 320. The coupling winding 334 can be wound around the center legs 312 and 322 of the cores 310 and 320, among possibly others. The use of the coupling winding 334 helps to avoid asymmetric flux interaction and coupling. At the same time, the sizes of the cores 310 and 320 can be reduced due to the benefit of flux cancellation in an HCL-structured coupled inductor.

The embodiments described herein also include new types and structures of coupled inductors. The coupled inductors can be further reduced in volume and footprint as compared to the designs described above. According to one aspect of the embodiments, the benefits of indirect coupling are established without the need for a separate coupling inductor $L_c$ or core for the coupling inductor $L_c$, which leads to a reduced volume and footprint for the coupled inductors described herein. Additionally, flux cancellation is leveraged to reduce the total volume and footprint of the cores in the coupled inductors. The coupled inductors described herein also facilitate faster transient response, smaller switching losses, and other benefits in multiphase buck power converters.

Figure 6:
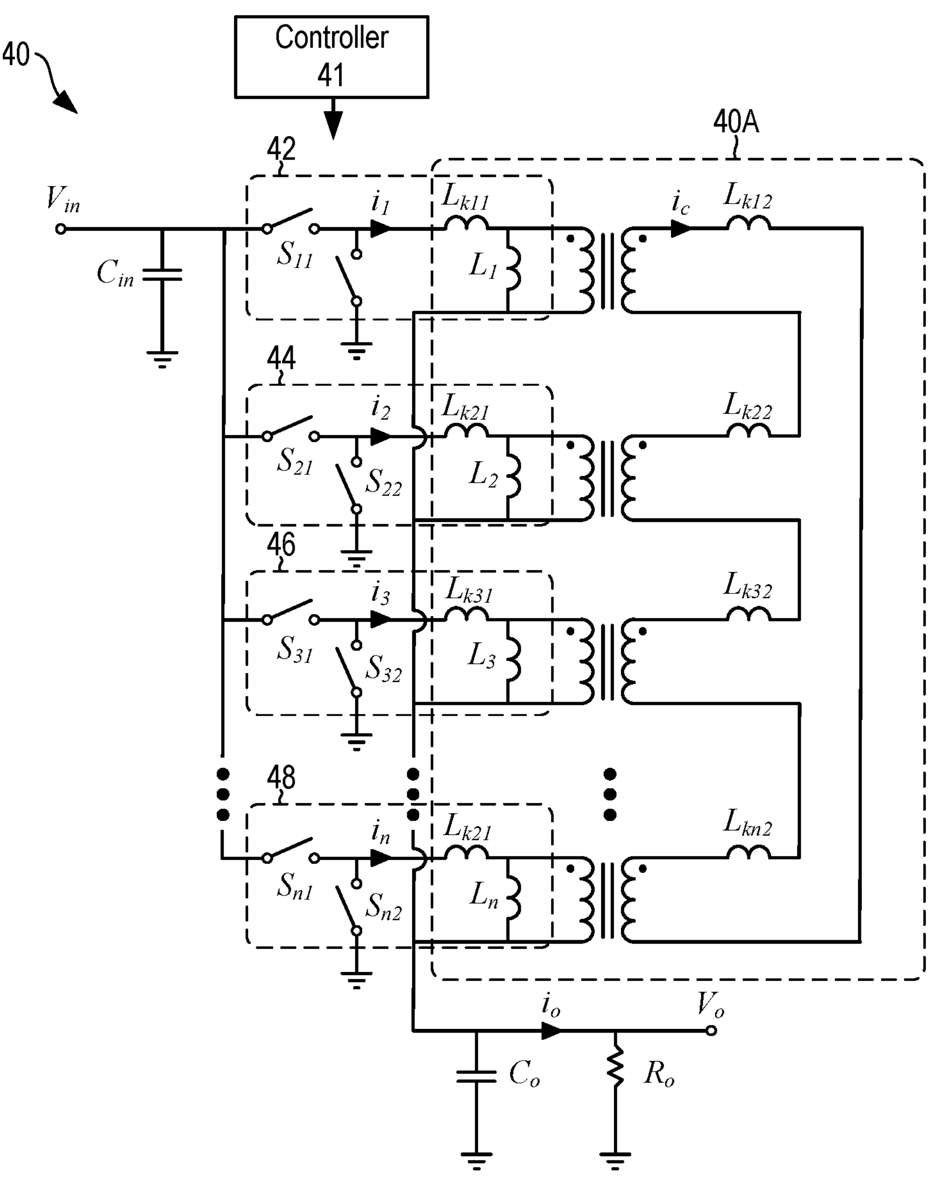
FIG. 6 illustrates another example multiphase buck power converter according to various aspects of the present disclosure.

FIG. 6 illustrates another example multiphase buck power converter 40 ("power converter 40"). In some cases, the power converter 40 can include other components that are not illustrated in FIG. 6, such as additional capacitors, additional inductors, additional diodes or switching transistors, and other components. The power converter 40 includes a controller 41 and converter stages 42, 44, 46, and 48 in the example shown. The power converter 40 can include any number of converter stages (e.g., "n" converter stages) in various examples. The power converter 40 can be implemented using a combination of integrated and discrete circuit components, for example, on one or more PCBs. The concepts of integrated controllable coupling described herein can be applied in the power converter 40, as one example, among other types of power converters.

The power converter 40 is a multiphase buck or step-down power converter and includes an input capacitor $C_{in}$ and an output capacitor $C_o$. An input voltage $V_{in}$ is applied as an input to the power converter 40, and an output voltage $V_o$ is generated at an output of the power converter 40. The converter stage 42 includes switching devices $S_{11}$ and $S_{12}$ and an inductor $L_1$, among possibly other components. The converter stage 44 includes switching devices $S_{21}$ and $S_{22}$ and an inductor $L_2$, among possibly other components. The converter stage 46 includes switching devices $S_{31}$ and $S_{32}$ and an inductor $L_3$, among possibly other components. The converter stage 48 includes switching devices $S_{n1}$ and $S_{n2}$ and an inductor $L_n$, among possibly other components.

The controller 41 can be relied upon to generate gate control signals to control the operation of the switching devices Sn, $S_{12}$, $S_{21}$, $S_{22}$ $S_{31}$, $S_{32}$, $S_{n1}$, and $S_{n2}$ at an operating frequency of the power converter 40, which can range among the embodiments. As one example, the switching devices at can be operated by PWM control signals generated by the controller 41, with a variation in phase (i.e., a phase shift) among the control signals for the converter stages 42, 44, 46, and 48. Based on the switching control, the switching devices switching devices $S_{11}$, $S_{12}$, $S_{21}$, $S_{22}$ $S_{31}$, $S_{32}$, $S_{n1}$, and $S_{n2}$ can be operated to charge the output capacitor $C_o$ based on energy stored in the inductors $L_1$, $L_2$, $L_3$, and $L_n$ during the switching cycles of the power converter 40. Power transferred to the output capacitor $C_o$ can be supplied to the load $R_o$ at the output voltage $V_o$.

The power converter 40 can also be implemented using a coupled inductor, and the circuit schematic of the power converter 40 shown in FIG. 6 illustrates an implementation using a coupled inductor 40A. The structure of the coupled inductor 40A achieves coupling among the inductors $L_1$, $L_2$, $L_3$, and $L_n$ and can be relied upon to achieve smaller steady-state current ripple, faster transient response, and smaller switching losses in the power converter 40. As compared to the coupled inductor 30A shown in FIG. 4, however, the coupled inductor 40A does not include the coupling inductor $L_c$. Instead, the structure of the cores in the coupled inductor 40A are modified according to the embodiments such that the coupling inductor Le can be omitted. Particularly, the cores in the coupled inductor 40A are modified to create leakage inductances, which result in the leakage inductors $L_{k11}$, $L_{k12}$, $L_{k21}$, $L_{k22}$, $L_{k31}$, $L_{k32}$, $L_{kn1}$, and $L_{kn2}$, as shown in FIG. 6. The leakage inductors $L_{k12}$, $L_{k22}$, $L_{k32}$, and $L_{kn2}$ serve the purpose of and replace the coupling inductor $L_c$. The coupled inductor 40A also does not rely upon a separate core for the leakage inductors $L_{k12}$, $L_{k22}$, $L_{k32}$, and $L_{kn2}$ which replace the coupling inductor $L_c$.

Figure 7:
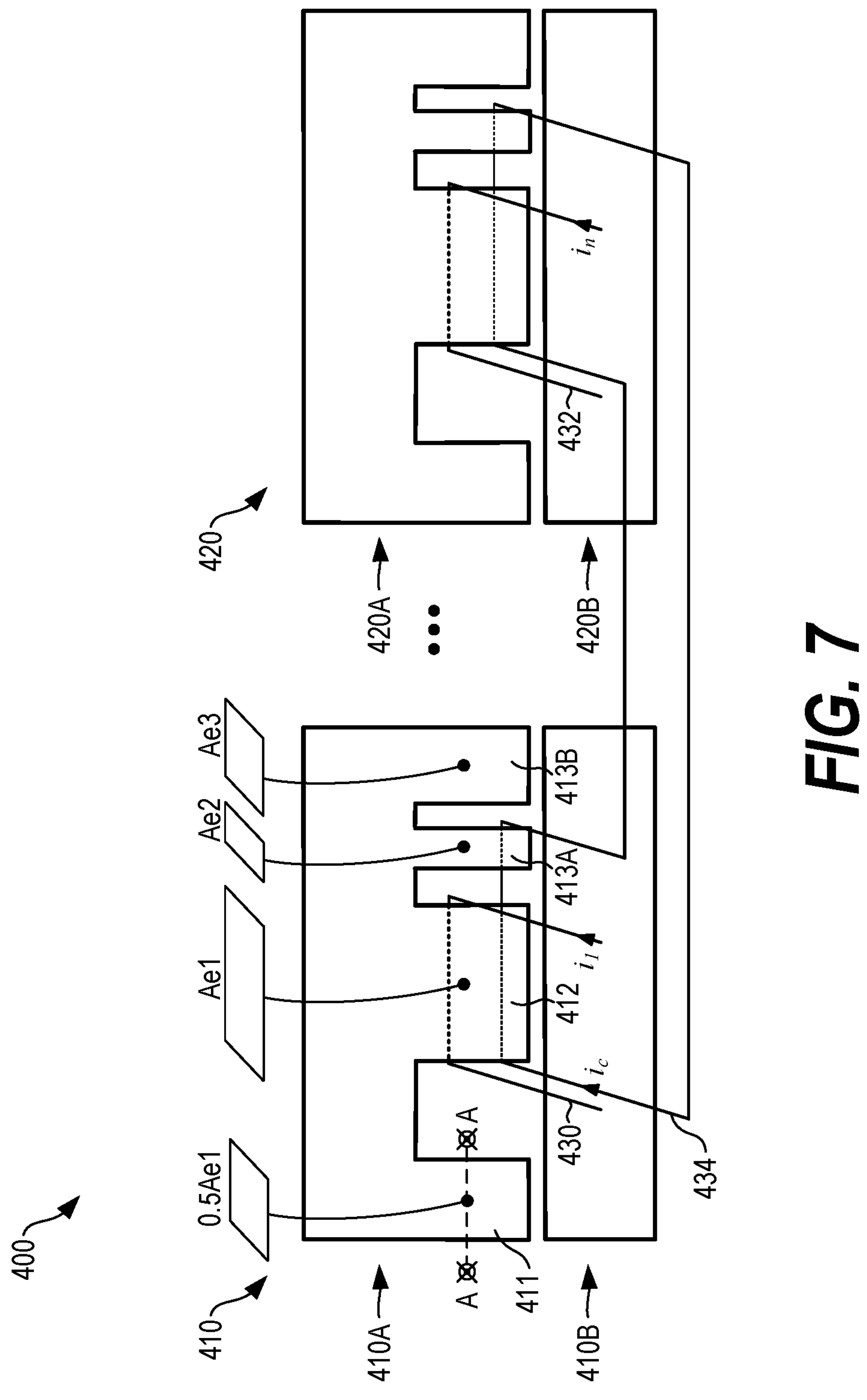
FIG. 7 illustrates another example indirect-coupled inductor according to various aspects of the present disclosure.

FIG. 7 illustrates another example indirect-coupled inductor 400 ("coupled inductor 400"). The coupled inductor 400 is another example of an ICL and can be relied as the coupled inductor 40A in the power converter 40, to provide coupling among the inductors $L_1$, $L_2$, $L_3$, and $L_n$. The coupled inductor 400 includes a core for each converter stage 42, 44, 46, and 48 in the power converter 40. For example, the coupled inductor 400 includes a core 410 for the inductor $L_1$ in the converter stage 42 and a core 420 for the inductor $L_n$ in the converter stage 48. The coupled inductor 400 also includes additional cores (not shown) for the converter stages 44 and 46. Thus, the coupled inductor 400 includes a separate or discrete core for each converter stage 42, 44, 46, and 48 in the power converter 40. The cores of the coupled inductor 400 are embodied as modified "EI" cores in the example shown. In other examples, the cores of the coupled inductor 400 can be embodied as modified "EE" cores. The cores of the coupled inductor 400 can be embodied as a material of high magnetic permeability, such as a ferromagnetic material like iron, laminated silicon steel, laminated iron sheets, or other solid or laminated ferromagnetic ceramic, metal, metal alloy, or related material(s).

The core 410 includes an "E" core component 410A and an "I" core component 410B. The core component 410A includes a first side leg 411, a center leg 412, and a second side leg. The second side leg is separated into two side leg segments, including a first side leg segment 413A and a second side leg segment 413B. The core 410 is illustrated as a representative example in FIG. 7. Thus, the relative sizes and positions of the first side leg 411, the center leg 412, the first side leg segment 413A, and the second side leg segment 413B are not drawn to any particular size or scale in FIG. 7. The relative sizes and positions of the first side leg 411, the center leg 412, the first side leg segment 413A, and the second side leg segment 413B can vary among the embodiments. The core 420 and other cores in the coupled inductor 400 also include side legs with two side leg segments.

The coupled inductor 400 includes a winding 430 to form the inductor $L_1$ for the converter stage 42, which is wound around the center leg 412 of the core component 410A. The coupled inductor 400 also includes a winding 432 to form the inductor $L_n$ for the converter stage 48, which is wound around a center leg of the core 420. The coupled inductor 400 also includes windings around center legs of cores for the inductors $L_2$ and $L_3$ in the converter stages 44 and 46 of the power converter 30.

The coupled inductor 400 also includes a coupling winding 434. The coupling winding 434 is wound around the center leg 412 and the first side leg segment 413A of the core 410. The coupling winding 434 is also wound in a similar way around the core 420 for the converter stage 48 and the other cores for the converter stages 44 and 46. The leakage inductors $L_{k11}$ and $L_{k12}$ are formed in the coupled inductor 400 because of the difference in the way the winding 430 for inductor $L_1$ extends around the center leg 412 only, whereas the coupling winding 434 extends around the center leg 412 and the first side leg segment 413A of the core 410. The leakage inductors $L_{k21}$, $L_{k22}$, $L_{k31}$, $L_{k32}$, $L_{kn1}$, and $L_{kn2}$ are also formed in a similar way.

The windings of the coupled inductor 400 can be embodied as conductive windings formed from a conductive material, such as copper, for example. In one example, the windings can be embodied as copper bar windings, although magnet wire, Litz wire, and other types of conductive wires can be relied upon for the windings. The windings for the inductors $L_1$, $L_2$, $L_3$, and $L_n$ of the power converter 40 can be embodied as one or more turns around the center legs of the cores of the coupled inductor 400 depending on the target inductance values of $L_1$, $L_2$, $L_3$, and $L_n$ and other considerations. The coupling winding 434 can also include one or more turns around the center and first side leg segments of the cores of the coupled inductor 400 depending on the target inductance values of the leakage inductors $L_{k11}$, $L_{k12}$, $L_{k21}$, $L_{k22}$, $L_{k31}$, $L_{k32}$, $L_{kn1}$, and $L_{kn2}$.

Coupling among the inductors $L_1$, $L_2$, $L_3$, and $L_n$ in the coupled inductor 400 is achieved by the coupling winding 434 and can be controlled by the combined inductances of the leakage inductors $L_{k12}$, $L_{k22}$, $L_{k32}$, and $L_{kn2}$. The inductances of the leakage inductors $L_{k11}$ and $L_{k12}$ can be controlled or tailored by adjusting the sizes and ratios of the cross-sectional areas of the first side leg 411, the center leg 412, the first side leg segment 413A, and the second side leg segment 413B of the core 410. As shown in FIG. 7, the cross-sectional area of the first side leg 411 includes the entire cross-sectional surface area of the first side leg 411, taken along the sectional plane A-A, which extends into the page in FIG. 7 and is referenced in FIG. 7 as 0.5Ae1. The cross-sectional area of the center leg 412 includes the entire cross-sectional surface area of the center leg 412, which is measured the same way as the first side leg 411 and is referenced in FIG. 7 as Ae1. The cross-sectional area of the first side leg segment 413A includes the entire cross-sectional surface area of the first side leg segment 413A, which is measured the same way as the first side leg 411 and is referenced in FIG. 7 as Ae2. The cross-sectional area of the second side leg segment 413B includes the entire cross-sectional surface area of the first side leg segment 413B, which is measured the same way as the first side leg 411 and is referenced in FIG. 7 as Ae3. The areas of Ae1, Ae2, and Ae3 can vary based on the size and structure of the core 410. Also, in other examples, the cross-sectional area surface area of the first side leg 411 can be different than the example of one-half of Ae1 or 0.5Ae1 as shown in FIG. 7 and described herein.

The inductances of the leakage inductors $L_{k12}$ and $L_{k22}$ can be controlled or tailored by adjusting the sizes and ratios of the cross-sectional areas of the first side leg 411, the center leg 412, the first side leg segment 413A, and the second side leg segment 413B from the core 410. In the example shown, the relationship between the cross-sectional areas of the first side leg 411 and the first side leg segment 413A is:

$$p = \frac{A_{e2}}{0.5A_{e1}}. \tag{1A}$$

Also, the combined surface areas of the first side leg segment 413A and the second side leg segment 413B are equivalent to that of the first side leg 411, such that:

$$A_{e3} = 0.5A_{e1} - A_{e2} \tag{1B}$$

Then, the relationship between and $L_1$ and the leakage inductances $L_{k12}$ and $L_{k22}$ is calculated as:

$$\frac{L_{k11}}{L_1} = \frac{p}{2-p} \text{ and} \tag{2A}$$

$$\frac{L_{k12}}{L_1} = \frac{1}{2}p. \tag{2B}$$

The values of the leakage inductances $L_{k12}$ and $L_{k22}$ can be controlled by the ratio of the cross-sectional areas of the side legs in the core 410. Additionally, the values of the leakage inductances $L_{kn1}$ and $L_{kn2}$ can be controlled by the ratio of the cross-sectional areas of the side legs in the core 420 and the other. Similarly, the values of the leakage inductances $L_{k21}$, $L_{k22}$, $L_{k31}$, and $L_{k32}$ can be controlled by the ratio of the cross-sectional areas of the side legs in the other cores in the coupled inductor 400. When the coupled inductor 40A of the power converter 40 shown in FIG. 6 is implemented using the coupled inductor 400 shown in FIG. 7, the function of the coupling inductor $L_c$ (e.g., as shown in FIG. 4) is replaced by the combined inductances of the leakage inductors $L_{k12}$, $L_{k22}$, $L_{k32}$, and $L_{kn2}$. The relationship between the coupling and p value is presented as:

$$|\alpha| = \frac{(2-p)^2(n-1)}{4(n-1)+4p-(n+1)p^2}, \tag{3}$$

where n is the number of phases in the multiphase buck power converter. The coupled inductor 400 does not rely upon a separate, additional core to establish the leakage inductors $L_{k12}$, $L_{k22}$, $L_{k32}$, and $L_{kn2}$. The total volume and footprint of the coupled inductor 400 can be reduced as compared to the coupled inductor 300 shown in FIG. 5B, by eliminating the coupling inductor $L_c$. The coupled inductor 400 also helps to achieve smaller steady-state current ripple and faster transient response in the power converter 40.

Figure 8:
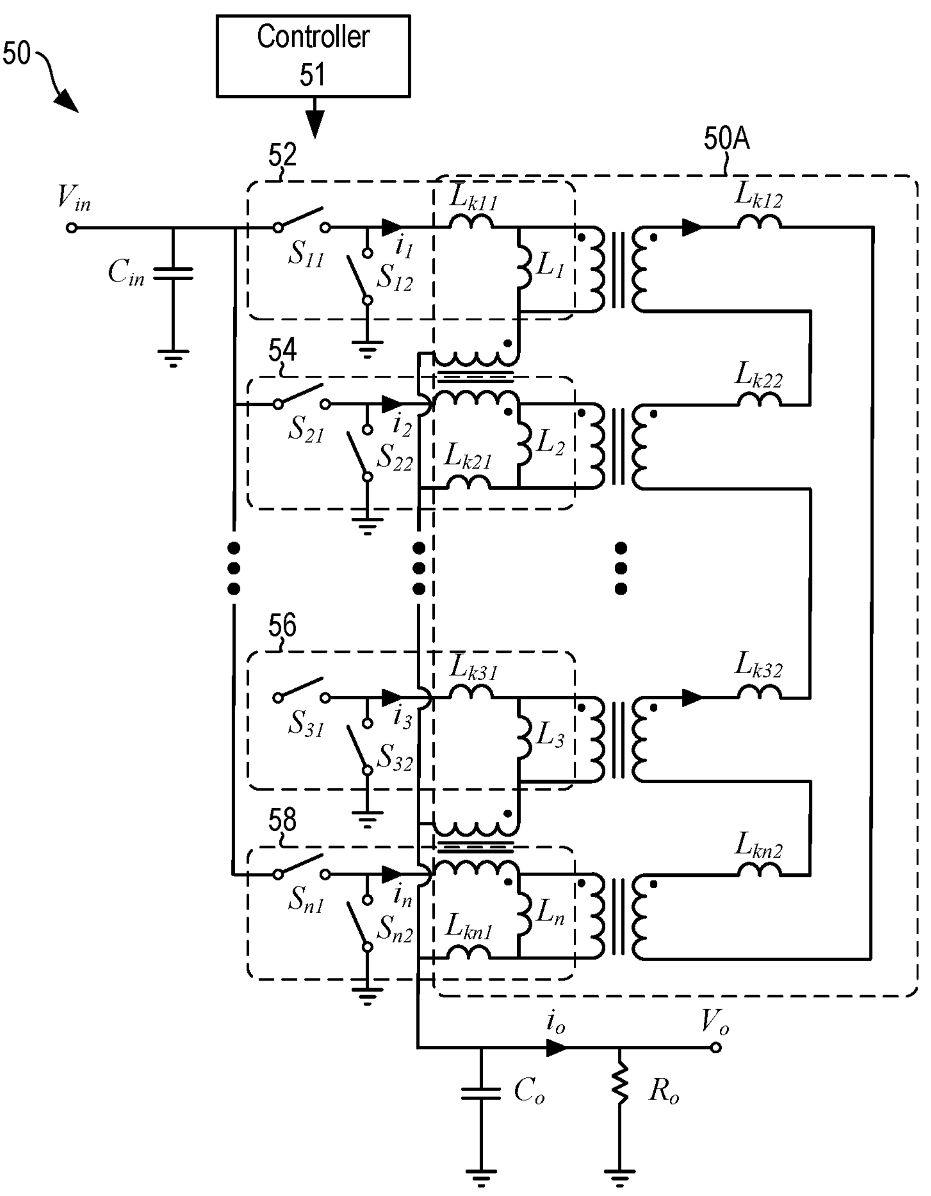
FIG. 8 illustrates another example multiphase buck power converter according to various aspects of the present disclosure.

FIG. 8 illustrates another example multiphase buck power converter 50 ("power converter 50"). In some cases, the power converter 50 can include other components that are not illustrated in FIG. 8, such as additional capacitors, additional inductors, additional diodes or switching transistors, and other components. The power converter 50 includes a controller 51 and converter stages 52, 54, 56, and 58 in the example shown. The power converter 50 can include any number of converter stages (e.g., "n" converter stages) in various examples. The power converter 50 can be implemented using a combination of integrated and discrete circuit components, for example, on one or more PCBs. The concepts of integrated controllable coupling described herein can be applied in the power converter 50, as one example, among other types of power converters.

The power converter 50 is a multiphase buck or step-down power converter and includes an input capacitor $C_{in}$ and an output capacitor $C_o$. An input voltage $V_{in}$ is applied as an input to the power converter 50, and an output voltage $V_o$ is generated at an output of the power converter 50. The converter stage 52 includes switching devices $S_{11}$ and $S_{12}$ and an inductor $L_1$, among possibly other components. The converter stage 54 includes switching devices $S_{21}$ and $S_{22}$ and an inductor $L_2$, among possibly other components. The converter stage 56 includes switching devices $S_{31}$ and $S_{32}$ and an inductor $L_3$, among possibly other components. The converter stage 58 includes switching devices $S_{n1}$ and $S_{n2}$ and an inductor $L_n$, among possibly other components.

The controller 51 can be relied upon to generate gate control signals to control the operation of the switching devices $S_{11}$, $S_{12}$, $S_{21}$, $S_{22}$ $S_{31}$, $S_{32}$, $S_{n1}$, and $S_{n2}$ at an operating frequency of the power converter 50, which can range among the embodiments. As one example, the switching devices at can be operated by PWM control signals generated by the controller 51, with a variation in phase (i.e., a phase shift) among the control signals for the converter stages 52, 54, 56, and 58. Based on the switching control, the switching devices switching devices $S_{11}$, $S_{12}$, $S_{21}$, $S_{22}$ $S_{31}$, $S_{32}$, $S_{n1}$, and $S_{n2}$ can be operated to charge the output capacitor $C_o$ based on energy stored in the inductors $L_1$, $L_2$, $L_3$, and $L_n$ during the switching cycles of the power converter 50. Power transferred to the output capacitor $C_o$ can be supplied to the load $R_o$ at the output voltage $V_o$.

The power converter 80 can also be implemented using a coupled inductor, and the circuit schematic of the power converter 50 shown in FIG. 8 illustrates an implementation using a coupled inductor 50A. The structure of the coupled inductor 40A achieves coupling among the inductors $L_1$, $L_2$, $L_3$, and $L_n$ and can be relied upon to achieve smaller steady-state current ripple, faster transient response, and smaller switching losses in the power converter 50. The coupled inductor 50A does not include the coupling inductor $L_c$. Instead, the structure of the cores in the coupled inductor 50A are modified to include side legs according to the embodiments, such that the coupling inductor $L_c$ can be omitted. The modification of the cores in the coupled inductor 50A leads to leakage inductances, which results in the leakage inductors $L_{k11}$, $L_{k12}$, $L_{k21}$, $L_{k22}$, $L_{k31}$, $L_{k32}$, $L_{kn1}$, and $L_{kn2}$, as shown in FIG. 8. The leakage inductors $L_{k12}$, $L_{k22}$, $L_{k32}$, and $L_{kn2}$ serve the purpose of and replace the coupling inductor $L_c$. The coupled inductor 50A does not rely upon a separate core for the leakage inductors $L_{k12}$, $L_{k22}$, $L_{k32}$, and $L_{kn2}$ to replace the coupling inductor $L_c$. Further, the coupled inductor 50A achieves flux cancellation to reduce the size of the core coupled inductor 50A.

Figure 9:
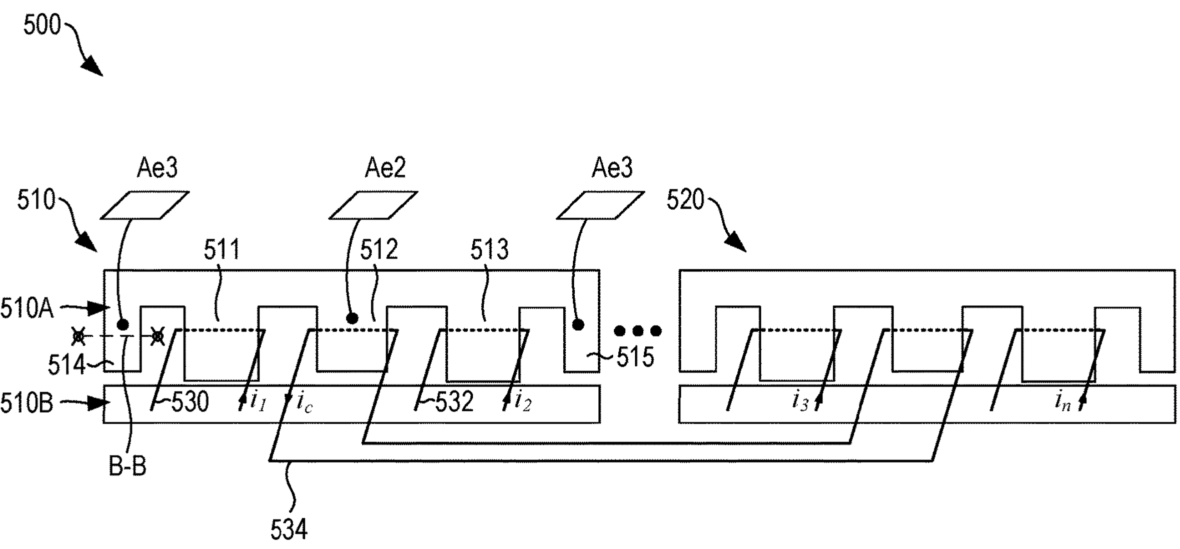
FIG. 9 illustrates an example hybrid indirect-coupled inductor according to various aspects of the present disclosure.

FIG. 9 illustrates an example hybrid-coupled inductor 500 ("coupled inductor 500"). The coupled inductor 500 can be relied as the coupled inductor 50A in the power converter 50 or a similar converter, to provide coupling among the inductors $L_1$, $L_2$, $L_3$, and $L_n$. The coupled inductor 500 includes a core 510 for the inductors $L_1$ and $L_2$ in the converter stages 52 and 54 and a core 520 for the inductors $L_3$ and $L_n$ in the converter stages 56 and 58. The coupled inductor 500 can also include additional cores (not shown) for additional converter stages, as needed. The cores of the coupled inductor 500 are embodied as modified "EI" cores in the example shown. In other examples, the cores of the coupled inductor 500 can be embodied as modified "EE" cores. The cores of the coupled inductor 500 can be embodied as a material of high magnetic permeability, such as a ferromagnetic material like iron, laminated silicon steel, laminated iron sheets, or other solid or laminated ferromagnetic ceramic, metal, metal alloy, or related material(s).

The core 510 includes an "E" core component 510A and an "I" core component 510B. The core component 510A includes a first leg 511, a center leg 512, and a second leg 513. The core component 510A also includes a first side leg 514 and a second side leg 515. The core 510 is illustrated as a representative example in FIG. 9. Thus, the relative sizes and positions of the legs of the core 510 are not drawn to any particular size or scale in FIG. 9 and can vary as compared to that shown. The core 520 and any other cores in the coupled inductor 500 are similar to the core 510.

The coupled inductor 500 includes a winding 530 to form the inductor $L_1$ for the converter stage 52, which is wound around the first leg 511 of the core component 510A. The coupled inductor 500 also includes a winding 532 to form the inductor $L_2$ for the converter stage 54, which is wound around the second leg 513 of the core component 510A. The coupled inductor 500 also includes a winding to form the inductor $L_3$ for the converter stage 56, which is wound around a first leg of the core 520. The coupled inductor 500 also includes a winding to form the inductor $L_n$ for the converter stage 58, which is wound around a second leg of the core 520.

The coupled inductor 500 also includes a coupling winding 534. The coupling winding 534 is wound around the center leg 512 of the core component 510A. The coupling winding 534 is also wound in a similar way around the core 520. The leakage inductors $L_{k1}$ and $L_{k12}$ are formed in the coupled inductor 500 based on the additional flux pathways provided by the first and second side legs 514 and 515 in the core 510. The leakage inductors $L_{k21}$, $L_{k22}$, $L_{k31}$, $L_{k32}$, $L_{kn1}$, and $L_{kn2}$ are also formed in a similar way.

The windings of the coupled inductor 500 can be embodied as conductive windings formed from a conductive material, such as copper, for example. In one example, the windings can be embodied as copper bar windings, although magnet wire, Litz wire, and other types of conductive wires can be relied upon for the windings. The windings for the inductors $L_1$, $L_2$, $L_3$, and $L_n$ of the power converter 50 can be embodied as one or more turns around the legs of the cores of the coupled inductor 500 depending on the target inductance values of $L_1$, $L_2$, $L_3$, and $L_n$ and other considerations. The coupling winding 534 can also include one or more turns around the center legs of the cores of the coupled inductor 500.

Coupling among the inductors $L_1$, $L_2$, $L_3$, and $L_n$ in the coupled inductor 500 is achieved by the coupling winding 534 and can be controlled by the combined inductances of the leakage inductors $L_{k12}$, $L_{k22}$, $L_{k32}$, and $L_{kn2}$. The inductances of the leakage inductors $L_{k11}$ and $L_{k12}$ can be controlled or tailored by adjusting the sizes and ratios of the cross-sectional areas of the first and second side legs 514 and 515 as compared to the cross-sectional area of the center leg 512. The cross-sectional area of the first side leg 514 includes the entire cross-sectional surface area of the first side leg 514, taken along the sectional plane B-B, which extends into the page in FIG. 9 and is referenced in FIG. 9 as Ae3. The cross-sectional area of the second side leg 515 includes the entire cross-sectional surface area of the second side leg 515 and is referenced in FIG. 9 as Ae3. The cross-sectional area of the center leg 512 includes the entire cross-sectional surface area of the center leg 513 and is referenced in FIG. 9 as Ae2. The areas of Ae2 and Ae3 can vary based on the size and structure of the core 510.

The inductances of the leakage inductors $L_{k11}$ and $L_{k12}$ can be controlled by adjusting the cross-sectional areas of the first and second side legs 512A and 512B as compared to the center leg 513. The relationship between the cross-sectional areas is defined as:

$$m = \frac{2A_{e3}}{A_{e2}}. \tag{4}$$

The relationship between the leakage inductances is calculated as:

$$L_{k11} = mL_1 \text{ and} \tag{5}$$

$$L_{k12} = \frac{1-\alpha_{core}}{\alpha_{core}}\frac{m}{2(m+1)}L_1, \tag{6}$$

where $\alpha_{core}$ is the coupling between two inductors in the same core formed by the flux path. Thus, inductances of the leakage inductors $L_{k11}$ and $L_{k12}$ can be controlled by adjusting the cross-sectional areas of the first and second side legs 514 and 515 as compared to the center leg 512. Particularly, the inductance values of the leakage inductors $L_{k11}$ and $L_{k12}$ can be controlled by adjusting the ratio of the cross-sectional areas of the first and second side legs 514 and 515 to the cross-sectional area of the center leg 512. The function of the coupling inductor, as present in other HCL-structured coupled inductors, is replaced by the leakage inductances integrated in the coupled inductor 500. The relationship between the coupling and the m value is presented as:

$$\alpha = \frac{\alpha_{core}[\alpha_{core}(2+mn)+2n+mn-2]}{\alpha_{core}(2n-2+mn+2\alpha_{core})+mn}, \tag{6}$$

where n is the phase number.

The use of the coupled inductor 500 in the power converter 50 leads to a faster transient response and smaller switching losses as compared to using discrete inductors $L_1$, $L_2$, $L_3$, and $L_n$. The total volume and footprint of the coupled inductor 500 can be reduced as compared to the coupled inductor 300 shown in FIG. 5B, for example, by eliminating the coupling inductor $L_c$. Additionally, flux cancellation in the "E" core component 510A of the core 510 and in the core 520 permits the reduction in the magnetic material needed to implement the cores 510 and 520, without an increase in core loss. Thus, the total volume and footprint of the coupled inductor 500 can be reduced in several ways as compared to other designs.

Figure 10A:
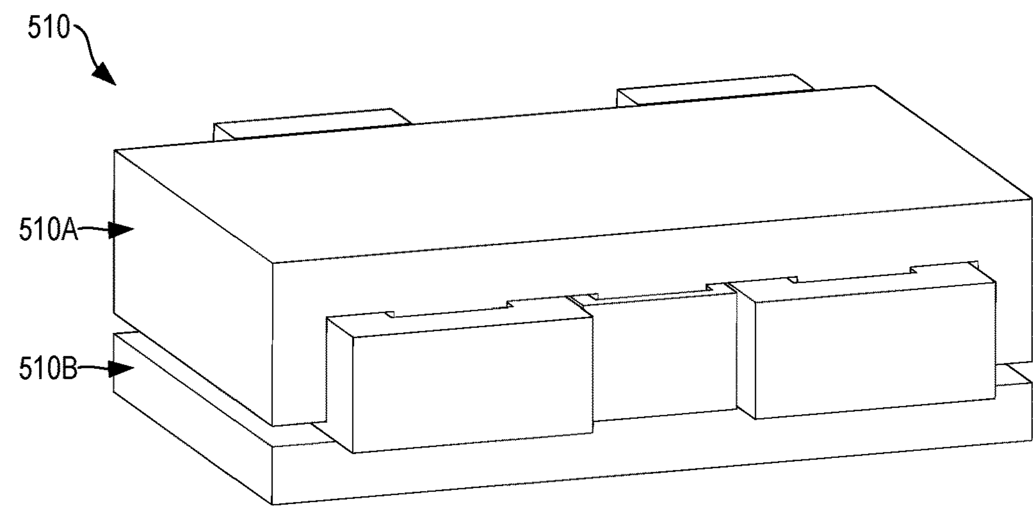
FIG. 10A illustrates an example of a core in the coupled inductor shown in FIG. 9 according to various aspects of the present disclosure.
Figure 10B:
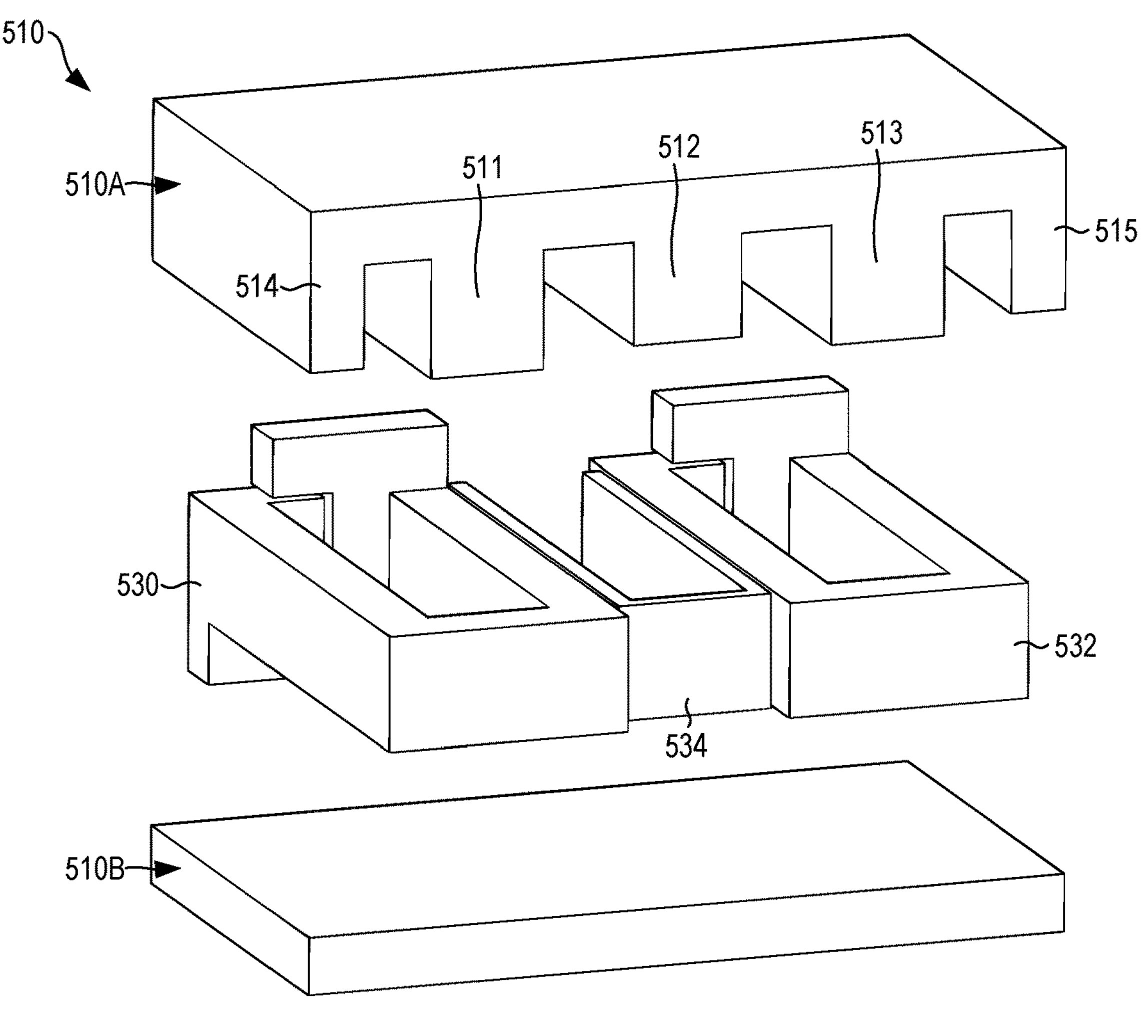
FIG. 10B illustrates an exploded view of the core shown in FIG. 10A according to various aspects of the present disclosure.

FIG. 10A illustrates an example of the core 510 of the coupled inductor 500 shown in FIG. 9, and FIG. 10B illustrates an exploded view of the core 510. Although not shown in FIGS. 10A and 10B, the core 520 of the coupled inductor 500 is similar to the core 520. As noted above, the core 510 includes an "E" core component 510A and an "I" core component 510B. The core component 510A includes the first leg 511, the center leg 512, and the second leg 513. The core component 510A also includes the first side leg 514 and the second side leg 515. The core 510 is illustrated as a representative example in FIGS. 10A and 10B and is not drawn to any particular size or scale.

The winding 530 forms the inductor $L_1$ for the converter stage 52 shown in FIG. 8, which is wound around the first leg 511 of the core component 510A. The winding 532 forms the inductor $L_2$ for the converter stage 54 shown in FIG. 8, which is wound around the second leg 513 of the core component 510A. The coupling winding 534 is wound around the center leg 512 of the core component 510A. Although not separately illustrated in FIGS. 10A and 10B, the core 520 of the coupled inductor 500 (see FIG. 9) can be similar to the core 510 shown in FIGS. 10A and 10B. In the example shown in FIGS. 10A and 10B, the windings 530, 532, and 534 are embodied as copper bar windings, although magnet wire, Litz wire, and other types of conductive wires can be relied upon for the windings.

Figure 11:
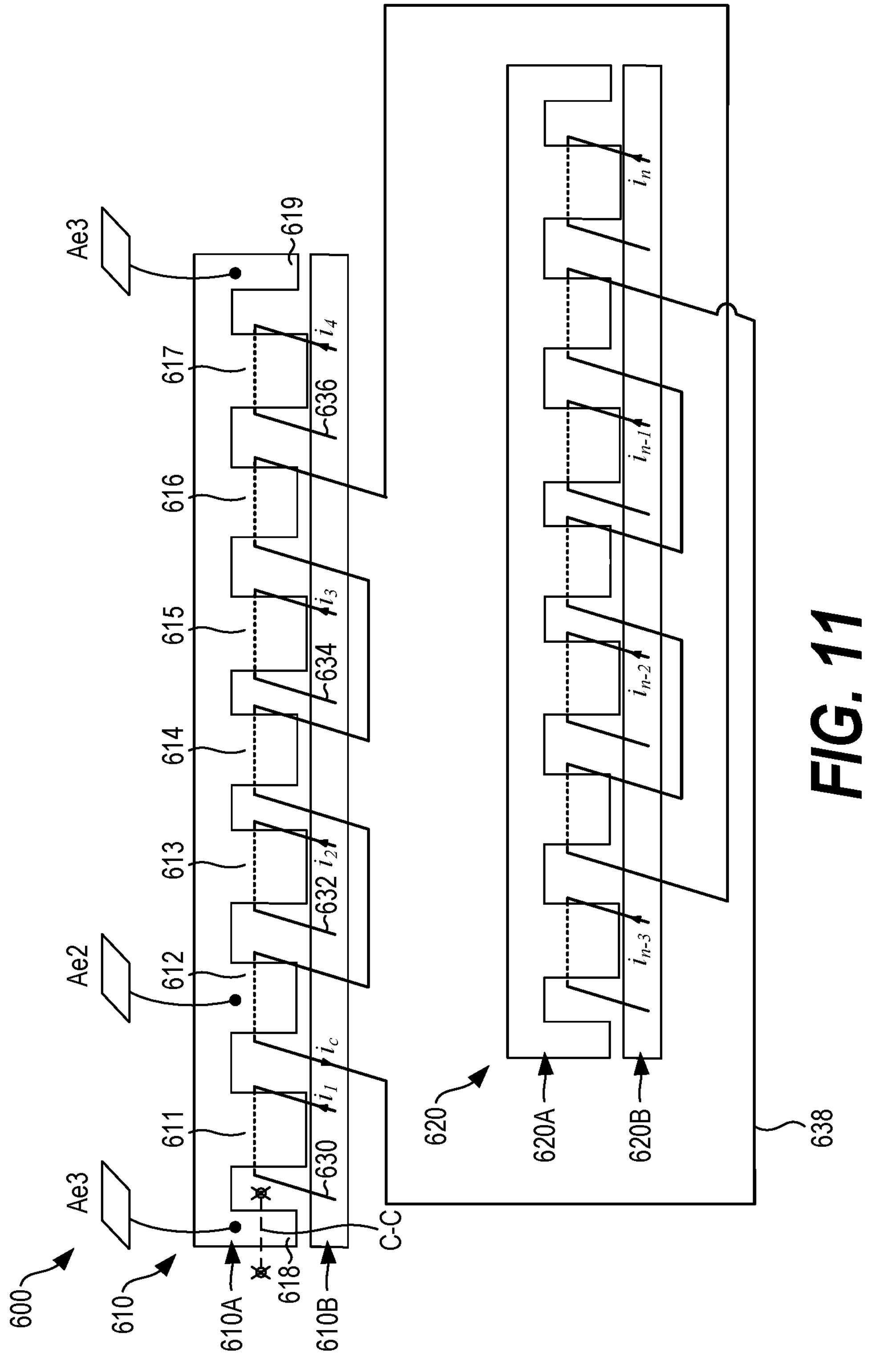
FIG. 11 illustrates another example hybrid indirect-coupled inductor according to various aspects of the present disclosure.

The coupled inductor 500 shown in FIG. 9 can also be extended for use with power converters having more stages. As one example, FIG. 11 illustrates another example hybrid-coupled inductor 600 ("coupled inductor 600"). The coupled inductor 600 can be relied as the coupled inductor 50A in the power converter 50, for example, if the power converter 50 is extended to include 8 converter stages or more. The coupled inductor 600 includes a core 610 for inductors $L_1$, $L_2$ $L_3$, and $L_4$ in four converter stages and a core 620 for inductors $L_{n-3}$, $L_{n-2}$ $L_{n-1}$, and $L_n$ in four additional converter stages. The coupled inductor 600 can also include additional cores (not shown) for additional converter stages, as needed. The cores of the coupled inductor 600 are embodied as modified "EI" cores in the example shown. In other examples, the cores of the coupled inductor 600 can be embodied as modified "EE" or other types of cores.

The core 610 includes an "E" core component 610A and an "I" core component 610B. The core component 610A includes a first leg 611, a first center leg 612, a second leg 613, a second center leg 614, and a third leg 615, a third center leg 616, and a fourth leg 617. The core component 610A also includes a first side leg 618 and a second side leg 619. The core 610 is illustrated as a representative example in FIG. 11. Thus, the relative sizes and positions of the legs of the core 610 are not drawn to any particular size or scale in FIG. 11 and can vary as compared to that shown. The core 620 and any other cores in the coupled inductor 600 are similar to the core 610.

The coupled inductor 600 includes a winding 630 to form the inductor $L_1$ for a first converter stage, which is wound around the first leg 611 of the core component 610A. The coupled inductor 600 also includes a winding 632 to form the inductor $L_2$ for a second converter stage, which is wound around the second leg 613 of the core component 610A. The coupled inductor 600 also includes a winding 634 to form the inductor $L_3$ for a third converter stage, which is wound around the third leg 615 of the core component 610A. The coupled inductor 600 also includes a winding 636 to form the inductor $L_4$ for a fourth converter stage, which is wound around the fourth leg 617 of the core component 610A. The coupled inductor 600 also includes a coupling winding 638. The coupling winding 638 is wound around the first center leg 612, the second center leg 614, and the third center leg 616 of the core component 610A. The coupling winding 634 is also wound in a similar way around the center legs of the core 620. Leakage inductors $L_{k12}$, $L_{k22}$, $L_{k33}$, and $L_{k42}$ are formed in the coupled inductor 600 based on the additional flux pathways provided by the first and second side legs 618 and 619 in the core 610. Leakage inductors $L_{k(n-3)2}$, $L_{k(n-2)2}$, $L_{k(n-1)2}$, and $L_{kn2}$ are also formed in a similar way.

The windings of the coupled inductor 600 can be embodied as conductive windings formed from a conductive material, such as copper, for example. In one example, the windings can be embodied as copper bar windings, although magnet wire, Litz wire, and other types of conductive wires can be relied upon for the windings. The windings for the inductors $L_1$, $L_2$, $L_3$, $L_4$, . . . $L_{n-3}$, $L_{n-2}$, $L_{n-1}$, and $L_n$ of the power converter 50 can be embodied as one or more turns around the legs of the cores of the coupled inductor 600 depending on the target inductance values and other considerations. The coupling winding 634 can also include one or more turns around the center legs of the cores of the coupled inductor 600.

Coupling among the inductors $L_1$, $L_2$, $L_3$, $L_4$, . . . $L_{n-3}$, $L_{n-2}$, $L_{n-1}$, and $L_n$ in the coupled inductor 600 is achieved by the coupling winding 638 and can be controlled by the combined inductances of the leakage inductors $L_{k12}$, $L_{k22}$, $L_{k33}$, $L_{k42}$ . . . $L_{k(n-3)2}$, $L_{k(n-3)2}$, $L_{k(n-1)2}$, and $L_{kn2}$. The inductance of the leakage inductor $L_{k12}$, for example, can be controlled or tailored by adjusting the sizes and ratios of the cross-sectional areas of the first and second side legs 618 and 619 as compared to the cross-sectional areas of the first center leg 612, the second center leg 614, and the third center leg 616. The cross-sectional area of the first side leg 618 includes the entire cross-sectional surface area of the first side leg 618, taken along the sectional plane C-C, which extends into the page in FIG. 11, and is referenced in FIG. 11 as Ae3. The cross-sectional area of the second side leg 619 includes the entire cross-sectional surface area of the second side leg 619 and is referenced in FIG. 11 as Ae3. The cross-sectional area of the first center leg 612 includes the entire cross-sectional surface area of the first center leg 612 and is referenced in FIG. 11 as Ae2. In the example shown, the cross-sectional area of the second center leg 614 and the third center leg 616 can also be Ae2, although the cross sectional areas of the center legs 612, 614, and 616 can vary as compared to each other in some cases. Overall, the areas of Ae2 and Ae3 can vary based on the size and structure of the core 610 to control the inductance of the leakage inductor $L_{k12}$ and the other leakage inductors $L_{k22}$, $L_{k33}$, $L_{k42}$ . . . $L_{k(n-3)2}$, $L_{k(n-2)2}$, $L_{k(n-1)2}$, and $L_{kn2}$.

Figure 12A:
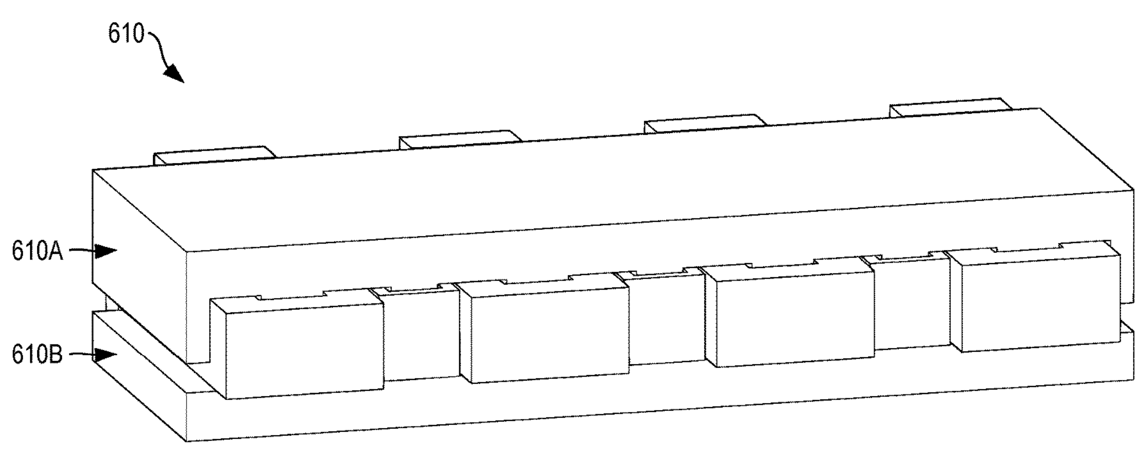
FIG. 12A illustrates an example of a core in the coupled inductor shown in FIG. 11 according to various aspects of the present disclosure.
Figure 12B:
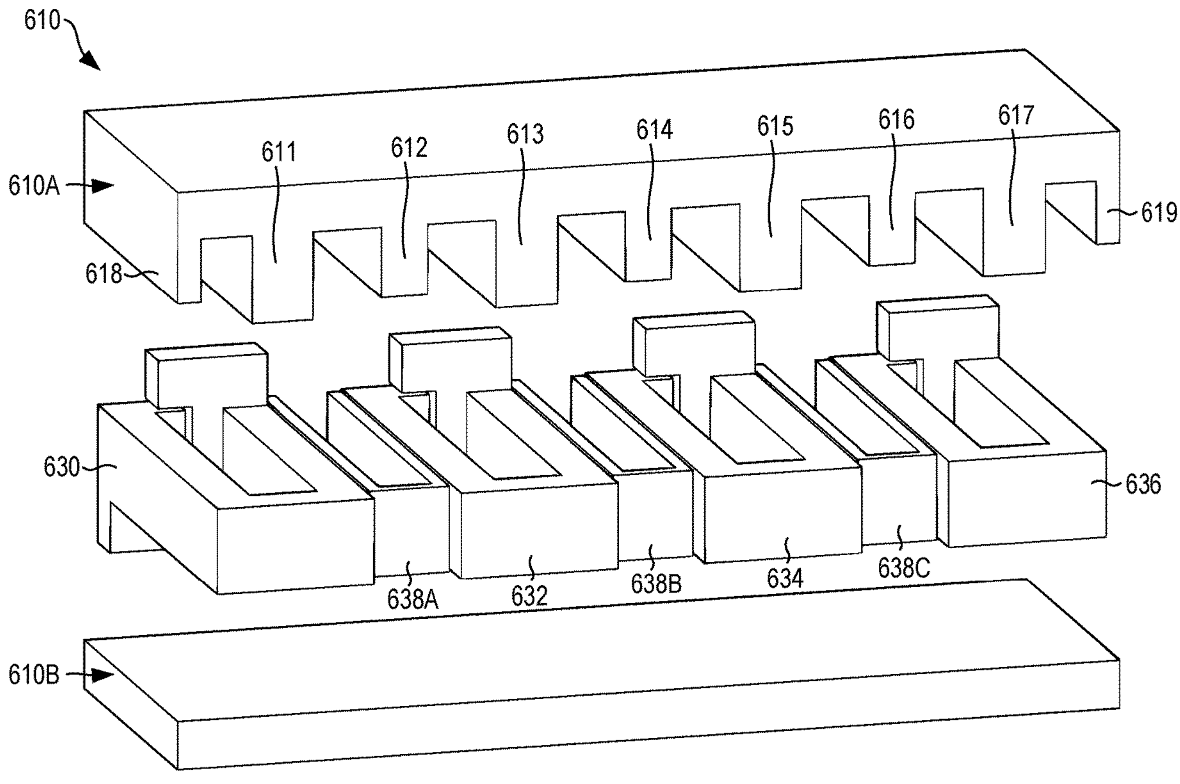
FIG. 12B illustrates an exploded view of the core shown in FIG. 12A according to various aspects of the present disclosure.

FIG. 12A illustrates an example of the core 610 of the coupled inductor 600 shown in FIG. 11, and FIG. 12B illustrates an exploded view of the core 610. Although not shown in FIGS. 12A and 12B, the core 620 of the coupled inductor 600 is similar to the core 620. As noted above, the core 610 includes an "E" core component 610A and an "I"

core component 610B. The core component 610A includes a first leg 611, a first center leg 612, a second leg 613, a second center leg 614, and a third leg 615, a third center leg 616, and a fourth leg 617. The core component 610A also includes a first side leg 618 and a second side leg 619. The core 610 is illustrated as a representative example in FIGS. 12A and 12B. Thus, the relative sizes and positions of the legs of the core 610 are not drawn to any particular size or scale and can vary as compared to that shown. The core 620 and any other cores in the coupled inductor 600 are similar to the core 610.

The coupled inductor 600 includes a winding 630 to form the inductor $L_1$ for a first converter stage, which is wound around the first leg 611 of the core component 610A. The coupled inductor 600 also includes a winding 632 to form the inductor $L_2$ for a second converter stage, which is wound around the second leg 613 of the core component 610A. The coupled inductor 600 also includes a winding 634 to form the inductor $L_3$ for a third converter stage, which is wound around the third leg 615 of the core component 610A. The coupled inductor 600 also includes a winding 636 to form the inductor $L_4$ for a fourth converter stage, which is wound around the fourth leg 617 of the core component 610A.

The coupled inductor 600 also includes a coupling winding, formed from coupling winding segments 638A-638C. The coupling winding segments 638A-638C can be electrically coupled together and form part of the coupling winding 638 shown in FIG. 11. The coupling winding is wound around the first center leg 612, the second center leg 614, and the third center leg 616 of the core component 610A. More particularly, the coupling winding segment 628A extends around the first center leg 612, the coupling winding segment 628B extends around the second center leg 614, and the coupling winding segment 628C extends around the third center leg 616. The coupling winding is also wound in a similar way around the center legs of the core 620. Leakage inductors $L_{k12}$, $L_{k22}$, $L_{k33}$, and $L_{k42}$ are formed in the coupled inductor 600 based on the additional flux pathways provided by the first and second side legs 618 and 619 in the core 610. Leakage inductors $L_{k(n-3)2}$, $L_{k(n-2)2}$, $L_{k(n-1)2}$, and $L_{kn2}$ are also formed in a similar way.

Although not separately illustrated in FIGS. 12A and 12B, the core 620 of the coupled inductor 600 (see FIG. 11) can be similar to the core 610 shown in FIGS. 12A and 12B. In the example shown in FIGS. 12A and 12B, the windings 630, 632, 634, 636, and 638A-638C are embodied as copper bar windings, although magnet wire, Litz wire, and other types of conductive wires can be relied upon for the windings.

The controllers described herein, including the controllers 11, 21, 32, 41, and 51, can be embodied as processing circuitry, including memory, configured to control the operation of the power converters, with or without feedback. The controllers can be embodied as any suitable type of controller, such as a proportional integral derivative (PID) controller, a proportional integral (PI) controller, or a multi-pole multi-zero controller, among others, to control the operations of the power converters. The controllers can be realized using a combination of processing circuitry and referenced as a single controller. It should be appreciated, however, that the controllers can be realized using a number of controllers, control circuits, drivers, and related circuitry, operating with or without feedback.

One or more microprocessors, microcontrollers, or DSPs can execute software to perform the control aspects of the embodiments described herein, such as the control aspects performed by the controllers 11, 21, 31, 41, and 51. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Terms such as "top," "bottom," "side," "front," "back," "right," and "left" are not intended to provide an absolute frame of reference. Rather, the terms are relative and are intended to identify certain features in relation to each other, as the orientation of structures described herein can vary. The terms "comprising," "including," "having," and the like are synonymous, are used in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included. The terms "about" and "substantially," unless otherwise defined herein to be associated with a particular range, percentage, or related metric of deviation, account for at least some manufacturing tolerances between a theoretical design and manufactured product or assembly, such as the geometric dimensioning and tolerancing criteria described in the American Society of Mechanical Engineers (ASME®) Y14.5 and the related International Organization for Standardization (ISO®) standards. Such manufacturing tolerances are still contemplated, as one of ordinary skill in the art would appreciate, although "about," "substantially," or related terms are not expressly referenced, even in connection with the use of theoretical terms, such as the geometric "perpendicular," "orthogonal," "vertex," "collinear," "coplanar," and other terms.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

What is claimed is:

1. A power converter, comprising:

a plurality of converter stages; and an integrated coupled inductor for the plurality of converter stages, the integrated coupled inductor comprising:

a magnetic core comprising a first side leg, a first leg, a center leg, a second leg, and a second side leg;

a first winding for a first converter stage among the plurality of converter stages, the first winding extending around the first leg; and a second winding for a second converter stage among the plurality of converter stages, the second winding extending around the second leg.

2. The power converter according to claim 1, wherein integrated coupled inductor further comprises:

a second magnetic core;

a third winding for a third converter stage among the plurality of converter stages, the third winding extending around a first leg of the second magnetic core; and a fourth winding for a fourth converter stage among the plurality of converter stages, the fourth winding extending around a second leg of the second magnetic core.

3. The power converter according to claim 2, wherein the integrated coupled inductor further comprises a coupling winding extending around the center leg of the magnetic core and a center leg of the second magnetic core.

4. The power converter according to claim 3, wherein the integrated coupled inductor does not include a coupling inductor separate from the magnetic core and the second magnetic core.

5. The power converter according to claim 3, wherein:

the magnetic core comprises leakage inductances $L_{k1}$ and $L_{k2}$;

the second magnetic core comprises leakage inductances $L_{k3}$ and $L_{k4}$; and the leakage inductances $L_{k1}$, $L_{k2}$, $L_{k3}$, and $L_{k4}$ form a coupling inductor in the integrated coupled inductor and are coupled in series with the coupling winding.

6. The power converter according to claim 5, wherein:

inductance values of the leakage inductances $L_{k1}$ and $L_{k2}$ are set by a ratio of cross-sectional areas of the first side leg and the second side leg of the magnetic core to a cross-sectional area of the center leg of the magnetic core.

7. The power converter according to claim 5, wherein:

inductance values of the leakage inductances $L_{k3}$ and $L_{k4}$ are set by a ratio of cross-sectional areas of a first side leg and a second side leg of the second magnetic core to a cross-sectional area of the center leg of the second magnetic core.

8. The power converter according to claim 1, wherein:

the magnetic core further comprising a second center leg, a third leg, a third center leg, and a fourth leg; and the integrated coupled inductor further comprises:

a third winding for a third converter stage among the plurality of converter stages, the third winding extending around the third leg; and a fourth winding for a fourth converter stage among the plurality of converter stages, the fourth winding extending around the fourth leg.

9. The power converter according to claim 8, wherein integrated coupled inductor further comprises:

a second magnetic core;

a fifth winding for a fifth converter stage among the plurality of converter stages, the fifth winding extending around a first leg of the second magnetic core;

a sixth winding for a sixth converter stage among the plurality of converter stages, the sixth winding extending around a second leg of the second magnetic core;

a seventh winding for a seventh converter stage among the plurality of converter stages, the seventh winding extending around a third leg of the second magnetic core;

an eighth winding for an eighth converter stage among the plurality of converter stages, the eighth winding extending around a fourth leg of the second magnetic core.

10. The power converter according to claim 9, wherein the integrated coupled inductor further comprises a coupling winding extending around center legs of the magnetic core and center legs of the second magnetic core.

11. The power converter according to claim 10, wherein the integrated coupled inductor does not include a coupling inductor separate from the magnetic core and the second magnetic core.

12. The power converter according to claim 1, wherein:

the power converter comprises a multiphase buck power converter; and the plurality of converter stages comprise a plurality of buck converter stages.

13. The power converter according to claim 1, wherein the integrated coupled inductor comprises a hybird indirect-coupled inductor.

14. A multiphase buck power converter, comprising:

a plurality of buck converter stages; and an integrated coupled inductor for the plurality of buck converter stages, the integrated coupled inductor comprising:

a first magnetic core comprising side legs;

a second magnetic core comprising side legs;

a first winding for a first buck converter stage among the plurality of buck converter stages, the first winding extending around the first magnetic core;

a second winding for a second buck converter stage among the plurality of buck converter stages, the second winding extending around the first magnetic core;

a third winding for a third buck converter stage among the plurality of buck converter stages, the first winding extending around the second magnetic core;

a fourth winding for a fourth buck converter stage among the plurality of buck converter stages, the fourth winding extending around the second magnetic core; and a coupling winding extending around the magnetic core and the second magnetic core.

15. The power converter according to claim 14, wherein the integrated coupled inductor does not include a coupling inductor separate from the magnetic core and the second magnetic core.

16. The power converter according to claim 15, wherein:

the magnetic core comprises leakage inductances $L_{k1}$ and $L_{k2}$;

the second magnetic core comprises leakage inductances $L_{k3}$ and $L_{k4}$; and the leakage inductances $L_{k1}$, $L_{k2}$, $L_{k3}$, and $L_{k4}$ form a coupling inductor in the integrated coupled inductor and are coupled in series with the coupling winding.

17. The power converter according to claim 16, wherein:

inductance values of the leakage inductances $L_{k1}$ and $L_{k2}$ are set by a ratio of cross-sectional areas of the side legs of the magnetic core to a cross-sectional area of a center leg of the magnetic core; and inductance values of the leakage inductances $L_{k3}$ and $L_{k4}$ are set by a ratio of cross-sectional areas of the side legs of the second magnetic core to a cross-sectional area of a center leg of the second magnetic core.

18. The power converter according to claim 16, wherein the integrated coupled inductor does not include a coupling inductor separate from the magnetic core and the second magnetic core.

19. The power converter according to claim 14, wherein the integrated coupled inductor comprises a hybird indirect-coupled inductor.

20. A power converter, comprising:

a plurality of converter stages; and an integrated coupled inductor for the plurality of converter stages, the integrated coupled inductor comprising:

a first magnetic core comprising a first side leg, a center leg, a first side leg segment, and a second side leg segment;

a first winding for a first converter stage among the plurality of converter stages, the first winding extending around the center leg of the first magnetic core;

a second magnetic core comprising a first side leg, a center leg, a first side leg segment, and a second side leg segment;

a second winding for a second converter stage among the plurality of converter stages, the second winding extending around a center leg of the second magnetic core; and a coupling winding extending around the center leg and the first side leg segment of the first magnetic core and around the center leg and the first side leg segment of the second magnetic core.

* * * * *